US012743821B2

(12) United States Patent
Nagamatsu et al.

(10) Patent No.: US 12,743,821 B2
(45) Date of Patent: Sep. 22, 2026

(54) RECORDING MEDIUM AND INFORMATION PROCESSING DEVICE

(71) Applicant: SEGA CORPORATION, Tokyo (JP)

(72) Inventors: Tadashi Nagamatsu, Tokyo (JP); Kenji Murakami, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 124 days.

(21) Appl. No.: 18/748,482

(22) Filed: Jun. 20, 2024

(65) Prior Publication Data

US 2024/0338861 A1 Oct. 10, 2024

Related U.S. Application Data

(63) Continuation of application No. PCT/JP2022/046222, filed on Dec. 15, 2022.

(30) Foreign Application Priority Data

Dec. 21, 2021 (JP) ................................ 2021-206851

(51) Int. Cl.
*G09G 5/00* (2006.01)
*G06T 11/00* (2006.01)
*G06V 20/20* (2022.01)

(52) U.S. Cl.
CPC .............. *G06T 11/00* (2013.01); *G06V 20/20* (2022.01)

(58) Field of Classification Search
CPC ....... G06T 11/00; G06T 19/00; G06T 19/006; G06T 7/74; G06T 7/94;
(Continued)

(56) References Cited

U.S. PATENT DOCUMENTS 5,736,982 A * 4/1998 Suzuki ..................... H04N 7/15 715/848
2002/0015040 A1* 2/2002 Takatsuka ............... G06T 15/20 345/427

(Continued)

FOREIGN PATENT DOCUMENTS

JP 2012-88776 A 5/2012
JP 2012-178069 A 9/2012

(Continued)

OTHER PUBLICATIONS

International Search Report issued in corresponding International Application No. PCT/JP2022/046222 mailed Mar. 14, 2023 (7 pages).

(Continued)

*Primary Examiner* — Gordon G Liu
(74) *Attorney, Agent, or Firm* — Osha Bergman Watanabe & Burton LLP

(57) ABSTRACT

A non-transitory computer readable recording medium stores instructions that cause a computer to execute: acquiring pieces of identification information of a plurality of objects based on an image of the objects captured by an imaging device; determining additional information based on a combination of the pieces of identification information and a disposition relationship of the objects in the image; and adding the additional information to the image and displaying the image to which the additional information has been added.

12 Claims, 20 Drawing Sheets

(58) Field of Classification Search

CPC . G06T 2207/10012; G06T 2207/20021; G06T 7/50; G06T 7/246; G06T 11/60; G06T 2207/20081; G06T 2207/20084; G06T 11/001; G06T 15/205; G06V 20/20; G06V 10/44; G06V 10/82; G06V 10/764; G06V 40/161; G06F 3/0484; G06F 3/011; G06F 3/012; G06F 3/04815; G02B 27/017; G02B 1/041; G02B 2027/0178; G02B 5/18; G02B 27/4205; G02B 27/0172; G02B 27/0101; H04L 67/52; H04N 7/152; H04N 5/265; H04N 23/90; H04N 23/63; G06Q 10/087; F21V 23/003; F21V 14/00; F21V 23/0435; F21V 21/15; G96V 10/24; H05B 47/105

USPC .......................................................... 345/633

See application file for complete search history.

(56) References Cited

U.S. PATENT DOCUMENTS

| | | | | |
|---|---|---|---|---|
| 2017/0266554 | A1* | 9/2017 | Marks | A63F 13/5255 |
| 2018/0093185 | A1* | 4/2018 | Black | A63F 13/26 |

FOREIGN PATENT DOCUMENTS

| | | | |
|---|---|---|---|
| JP | 2013-122708 | A | 6/2013 |
| JP | 2013-228959 | A | 11/2013 |
| JP | 5551205 | B2 | 7/2014 |
| JP | 2015-41126 | A | 3/2015 |
| JP | 2015-79444 | A | 4/2015 |
| JP | 6262127 | B2 | 1/2018 |
| JP | 2018-36869 | A | 3/2018 |
| JP | 2018-205828 | A | 12/2018 |
| JP | 2019-160332 | A | 9/2019 |
| JP | 2021-74096 | A | 5/2021 |
| WO | 2006/025137 | A1 | 3/2006 |
| WO | 2016/111174 | A1 | 7/2016 |

OTHER PUBLICATIONS

Written Opinion issued in corresponding International Application No. PCT/JP2022/046222 mailed Mar. 14, 2023 (7 pages).

* cited by examiner

| Effect ID | Effect data path name |
| --- | --- |
| E01 | E01/•••.dat |
| E02 | E02/•••.dat |
| •<br>•<br>• | •<br>•<br>• |

| Type of figure | Effect ID |
| --- | --- |
| Human character A | E01 |
| Bear | E02 |
| ·<br>·<br>· | ·<br>·<br>· |

| Shape of figure | Effect ID |
|---|---|
| Excited pose | E11 |
| Equipped with weapon A | E12 |
| . . . | . . . |

FIG. 7B

| Combination of plurality of figures | Effect ID |
|---|---|
| F01, F02 | E101 |
| F01,F02,F03 | E102 |
| . . . | . . . |

FIG. 7C

| Disposition relationship of plurality of figures | Effect ID |
|---|---|
| Figures all facing forward | E201 |
| Figures side by side | E202 |
| Figures no more than 5 cm apart | E203 |
| Figures facing each other | E204 |
| Figures back to back | E205 |
| . . . | . . . |

FIG. 7D

| Disposition sequence | Effect ID |
|---|---|
| Facing forward → facing each other | E301 |
| Distance between figures at least 5 cm → no more than 5 cm | E302 |
| Side by side → in triangular shape | E303 |
| . . . | . . . |

FIG. 7E

| Special effect mode | Name | Details |
|---|---|---|
| A | Combination mode | Effect corresponding to combination |
| B | Figure disposition mode | Effect corresponding to disposition relationship and disposition sequence |
| C | Imaging position mode | Effect corresponding to imaging position, imaging orientation, and camera work |
| D | Current position mode | Effect corresponding to current position |
| E | Period and weather mode | Effect corresponding to current period and weather |

FIG. 8

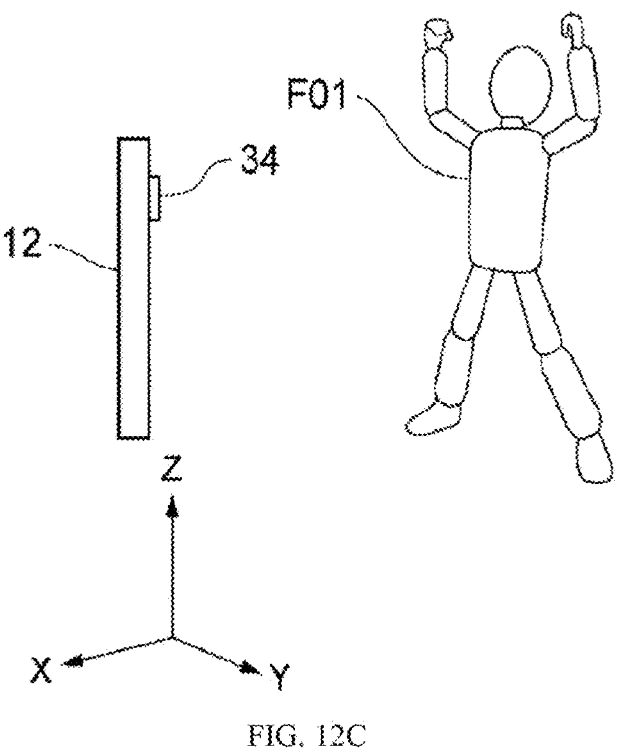
FIG. 12C
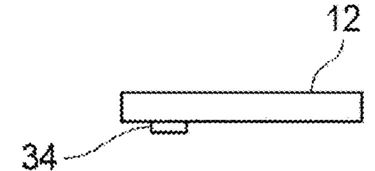
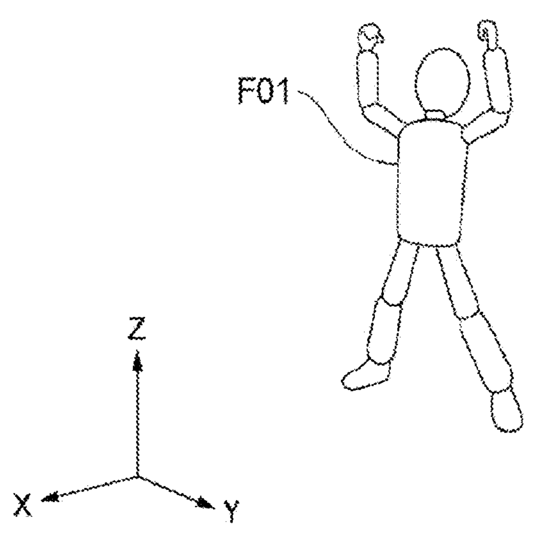
FIG. 12D

| Position | Effect ID |
|---|---|
| (xxx,yyy) | E401 |
| (XXX,YYY) | E402 |
| ⋮ | ⋮ |

FIG. 13A

| Period | Weather | Effect ID |
|---|---|---|
| Spring | Clear | E501 |
| | Rainy | E502 |
| | Thunder | E503 |
| | Snow | E504 |
| Summer | Clear | E505 |
| | Rainy | E506 |
| | Thunder | E507 |
| | Snow | E508 |
| ⋮ | ⋮ | ⋮ |

FIG. 13B

| Imagining position / imaging orientation | Effect ID |
|---|---|
| Located within 5 cm / right side | E601 |
| Located within 5 cm / back | E602 |
| Located within 5 cm / left side | E603 |
| Located 5 to 10 cm / top view | E604 |
| ⋮ | ⋮ |

FIG. 13C

| Camera work | Effect ID |
|---|---|
| Left side → back → right side | E701 |
| Facing front, zoomed in | E702 |
| ⋮ | ⋮ |

FIG. 13D

RECORDING MEDIUM AND INFORMATION PROCESSING DEVICE

BACKGROUND

Technical Field

The present invention relates to a recording medium storing instructions and an information processing device.

Description of Related Art

There is a known technique called augmented reality (AR), in which additional information such as digital content is added to real-world information through a smartphone or the like. For example, there is a technique in which an AR marker is detected based on an image or video acquired by a camera (hereinafter sometimes referred to as a "captured image") and a virtual image of a virtual object generated based on this AR marker is added to the captured image and displayed as an effect.

Regarding this technique, Patent Literature 1 below, for example, discloses that a composite AR marker constructed by linking a plurality of blocks (marker construction elements) is detected based on a captured image of a plurality of linked blocks, and the display of a virtual image is changed according to this composite AR marker.

Also, Patent Literature 2 below discloses that an image obtained by capturing a specific mark made on a figure installation base is recognized, and if there are a plurality of specific marks that are image-recognized, the virtual image used for effect is changed according to that combination.

PATENT LITERATURE

Patent Literature 1: Japanese Patent No. 6262127
Patent Literature 2: Japanese Patent No. 5551205

Technological Problems to be Solved by the Invention

With the technique disclosed in Patent Literature 1, a virtual image is generated based on a composite AR marker detected when a plurality of linked blocks are captured. This composite AR marker is defined by the order in which the blocks are arranged in a plurality of linked states. Consequently, in this technique, when a plurality of unlinked blocks are captured, a composite AR marker is not defined and a virtual image cannot be generated.

Also, with the technique disclosed in Patent Literature 2, when a plurality of unlinked objects are captured, the virtual image can be changed based on the combination of the objects, but the disposition relationship and the imaging position of the objects, the imaging orientation, and so forth are not taken into account. Consequently, the same effect will be applied to the captured image regardless of these situations.

SUMMARY

One or more embodiments of the present invention provide a recording medium storing instructions and an information processing device that enable generating and displaying an image or video to which additional information is added based on various situations of objects, or surrounding environments of an imaging device. This provides graphical improvements in gaming technology, with which enjoyability of graphical effects in an image can be enhanced.

The non-transitory computer readable recording medium according to a first aspect of the present invention stores instructions that cause a computer to execute: acquiring pieces of identification information of a plurality of objects based on an image of the objects captured by an imaging device; determining additional information based on a combination of the pieces of identification information and a disposition relationship of the objects in the image; and adding the additional information to the image and displaying the image to which the additional information has been added.

With the non-transitory computer readable recording medium according to a second aspect of the present invention, the determining includes determining a position or size of the additional information to be displayed in the image based on at least the disposition relationship, and the displaying includes displaying the image to which the additional information has been added in the position or size.

With the non-transitory computer readable recording medium according to a third aspect of the present invention, in a case that the disposition relationship changes, the determining includes determining pieces of additional information corresponding to the disposition relationship that is changing, and the displaying includes switching the pieces of additional information to be added to the image such that one of the pieces of additional information is displayed on the image depending on the disposition relationship that has been changed.

With the non-transitory computer readable recording medium according to a fourth aspect of the present invention, in a case that a serial sequence of disposition relationships of the objects changing in a predetermined order matches a specific disposition sequence, the determining includes determining the additional information corresponding to the specific disposition sequence, and the displaying includes displaying the image to which the additional information corresponding to the specific disposition sequence has been added.

The non-transitory computer readable recording medium according to a fifth aspect of the present invention stores the instructions that cause the computer to execute: storing pieces of additional information, and when displaying the image to which the additional information has been added, storing information indicating the objects included in the image as displayed objects; and once the displayed objects satisfy a specific condition, changing, or adding additional information to, the pieces of additional information stored in the storing.

With the non-transitory computer readable recording medium according to a sixth aspect of the present invention, in a case that a three-dimensional imaging position and imaging orientation of the imaging device change with respect to a three-dimensional object, the determining includes determining pieces of additional information based on the three-dimensional imaging position and imaging orientation that are changing, and the displaying includes switching the pieces of additional information to be added to the image such that one of the pieces of additional information is displayed on the image depending on the imaging position and imaging orientation that have been changed.

With the non-transitory computer readable recording medium according to a seventh aspect of the present invention, in a case that a camera work indicating a serial sequence of the imaging position and imaging orientation changing in a predetermined order matches a specific camera work, the determining includes determining the additional information corresponding to the specific camera work, and the displaying includes displaying the image to which the additional information corresponding to the specific camera work has been added.

With the non-transitory computer readable recording medium according to an eighth aspect of the present invention, a shape of each of the objects can be changed by moving, attaching, or detaching at least one of parts of each of the objects, or rearranging the parts, and the determining includes determining pieces of additional information corresponding to the shape that is changing, and the displaying includes switching the pieces of additional information to be added to the image such that one of the pieces of additional information is displayed on the image depending on the shape that has been changed.

With the non-transitory computer readable recording medium according to a ninth aspect of the present invention, the determining includes determining the additional information based on a current position of the imaging device that captures the image of the objects.

The non-transitory computer readable recording medium according to a tenth aspect of the present invention stores the instructions that cause the computer to execute: determining whether to add the additional information to the image based on the current position and positions stored in association with the pieces of identification information, the displaying includes: when determining to add the additional information to the image, displaying the image to which the additional information has been added, and when determining not to add the additional information to the image, displaying the image without adding any additional information to the image.

With the non-transitory computer readable recording medium according to an eleventh aspect of the present invention, the determining includes determining the additional information based on a predetermined actual time period or weather.

With the non-transitory computer readable recording medium according to a twelfth aspect of the present invention, the additional information includes a background image to be superimposed on a background of the objects, and when superimposing the background image on the image, the displaying includes switching the image of the objects captured by the imaging device to an image of a virtual object, and after a specific change is made, the image of the virtual object is switched back to the image of the objects captured by the imaging device.

The non-transitory computer readable recording medium according to a twelfth aspect of the present invention stores the instructions that cause the computer to execute: controlling a specific game based on the additional information added to the image.

An information processing device according to a thirteenth aspect of the present invention comprises: a hardware processor that: acquires pieces of identification information of a plurality of objects based on an image of the objects captured by an imaging device; determines additional information based on a combination of the pieces of identification information and a disposition relationship of the objects in the image; and adds the additional information to the image and displays the image to which the additional information has been added.

According to one or more embodiments of the present invention, it becomes possible to generate and display an image or video to which additional information is added based on various situations of objects, or surrounding environments of the imaging device. This provides graphical improvements in gaming technology, with which the enjoyability of graphical effects in the image can be enhanced.

BRIEF DESCRIPTION OF THE DRAWINGS

FIG. 7B is a diagram showing a configuration example of the correlation information;

FIG. 7C is a diagram showing a configuration example of the correlation information;

FIG. 7D is a diagram showing a configuration example of the correlation information;

FIG. 7E is a diagram showing a configuration example of the correlation information;

FIG. 8 is a table illustrating the types of special effect modes;

FIG. 12C is a diagram conceptually illustrating the imaging position and an imaging orientation;

FIG. 12D is a diagram conceptually illustrating the imaging position and an imaging orientation;

FIG. 13A is a diagram showing a configuration example of the correlation information according to a second embodiment;

FIG. 13B is a diagram showing a configuration example of the correlation information according to the second embodiment;

FIG. 13C is a diagram showing a configuration example of the correlation information according to the second embodiment;

FIG. 13D is a diagram showing a configuration example of the correlation information according to the second embodiment;

DETAILED DESCRIPTION

First Embodiment

Figure 1:
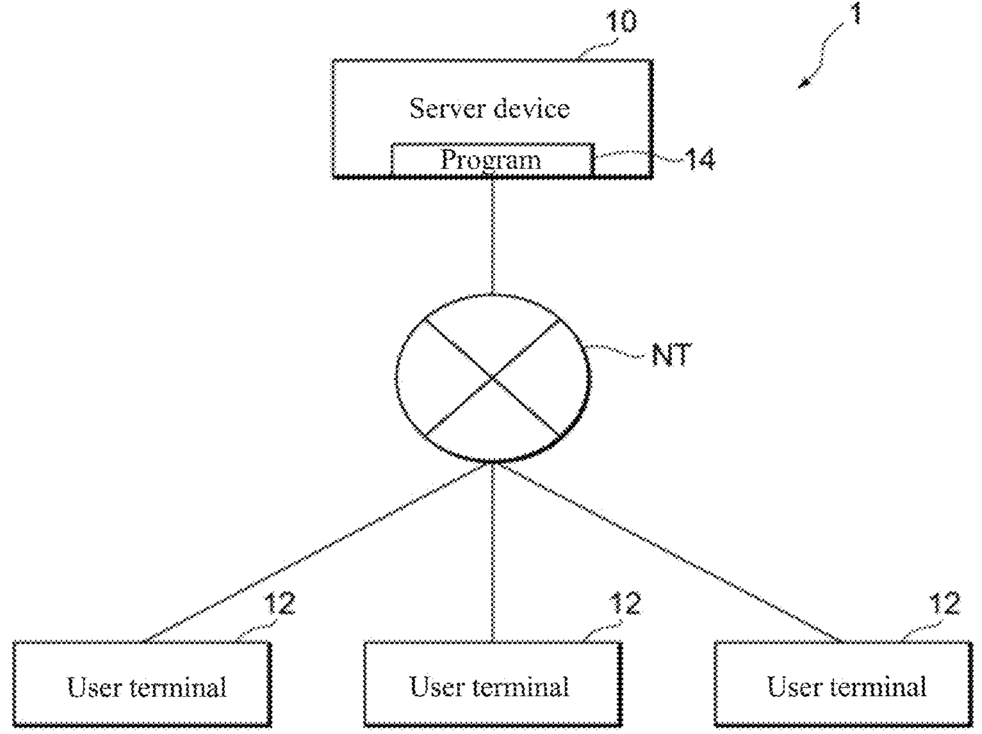
FIG. 1 is a block diagram showing an example of the overall configuration of an augmented reality system according to a first embodiment.

A first embodiment of the present invention will now be described in detail with reference to FIGS. 1 to 11. In order to facilitate understanding of the description, the same components and steps in the drawings shall be numbered the same as much as possible, and redundant explanation shall be omitted.

Overall Configuration

FIG. 1 is a block diagram showing an example of the overall configuration of an augmented reality system 1 according to the first embodiment.

As shown in FIG. 1, the augmented reality system 1 comprises a server device 10 and one or more user terminals 12. The server device 10 and user terminals 12 are configured to be able to communicate with each other via a communication network NT, such as an intranet, the Internet, or telephone lines.

The server device 10 is an information processing device that executes instructions including a program 14 of an augmented reality (AR) application for experiencing augmented reality, and provides the execution result thus obtained, or the program 14 itself, to the user terminals 12 via the communication network NT.

The user terminals 12 are each an information processing device belonging to a user. Examples of these user terminals 12 include smartphones, mobile phones, tablets, personal computers, and various other such devices. In this embodiment, the user terminals 12 will be described as smartphones.

The augmented reality application in this embodiment can be actuated based on a specific operation performed by the user on the user terminal 12 after the program 14 has been installed on the user terminal 12. This augmented reality application adds additional information, such as image or audio, to the captured images when a plurality of objects are captured by the user terminal 12, and displays an image that fuses the real world and the additional information on the screen of the user terminal 12.

Examples of objects captured by the user terminal 12 include shaped objects having a specific shape, such as figures, toys, plastic models, and stuffed animals. In this embodiment, the object will be described as a three-dimensional solid object, specifically a figure. A figure is a three-dimensional object model of a character, animal, person, etc., from a specific animation.

In this embodiment, the downloading and installation of the program 14 and the actuation of the augmented reality application may be accomplished, for example, by reading specific download information on the user terminal 12. This download information may be, for example, a QR code (registered trademark), a URL, or the like added to an instruction manual inside the figure package, and can be obtained by purchasing the figure.

The execution results of the program 14 on the server device 10 may be provided to the user terminals 12 via the communication network NT, without having to install the program 14 for the augmented reality application on the user terminals 12. In this case, the augmented reality application is actuated as a web application to be used on a web browser via the communication network NT based on a specific operation by the user on the user terminal 12, for example. Examples of the specific operation here include clicking on a link at a specific website on the user terminal 12, or scanning a specific QR code (registered trademark) displayed at a specific store, event venue, etc., with the user terminal 12.

Hardware Configuration

Figure 2:
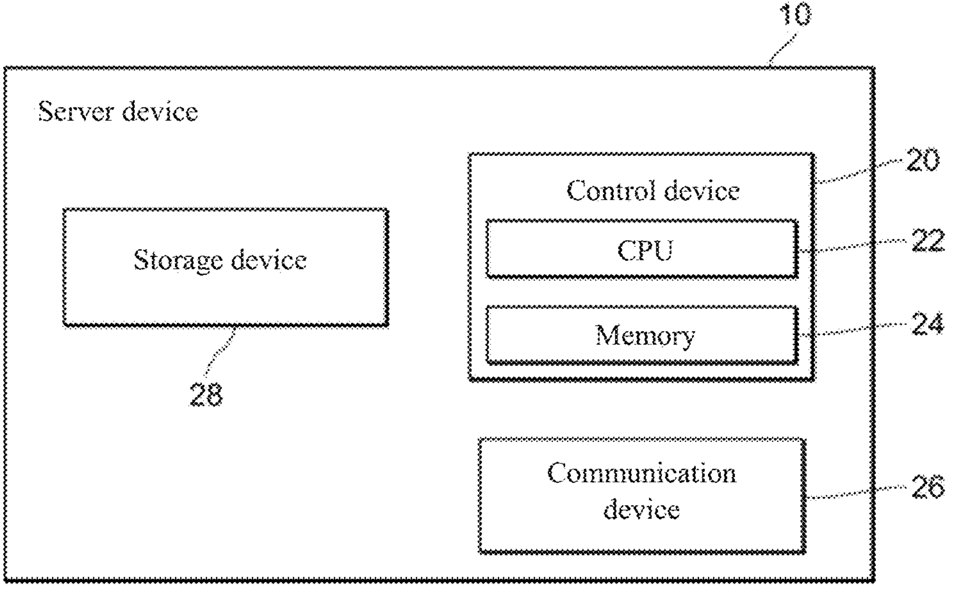
FIG. 2 is a block diagram showing an example of the hardware configuration of the server device shown in FIG. 1.

FIG. 2 is a block diagram showing an example of the hardware configuration of the server device 10 shown in FIG. 1.

As shown in FIG. 2, the server device 10 comprises a control device 20, a communication device 26, and a storage device 28. The control device 20 primarily includes a CPU (central processing unit) 22 and a memory 24.

In the control device 20, the CPU 22 executes a specific instruction(s) stored in the memory 24, a storage device 28, or the like.

The communication device 26 is constituted by a communication interface or the like for communicating with an external device. This communication device 26 transmits and receives various kinds of information to and from the user terminals 12, for example.

The storage device 28 is constituted by a hard disk or the like. This storage device 28 stores various kinds of instructions and various kinds of information necessary for the execution of processing in the control device 20, including the program 14, as well as information on processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server.

Figure 3:
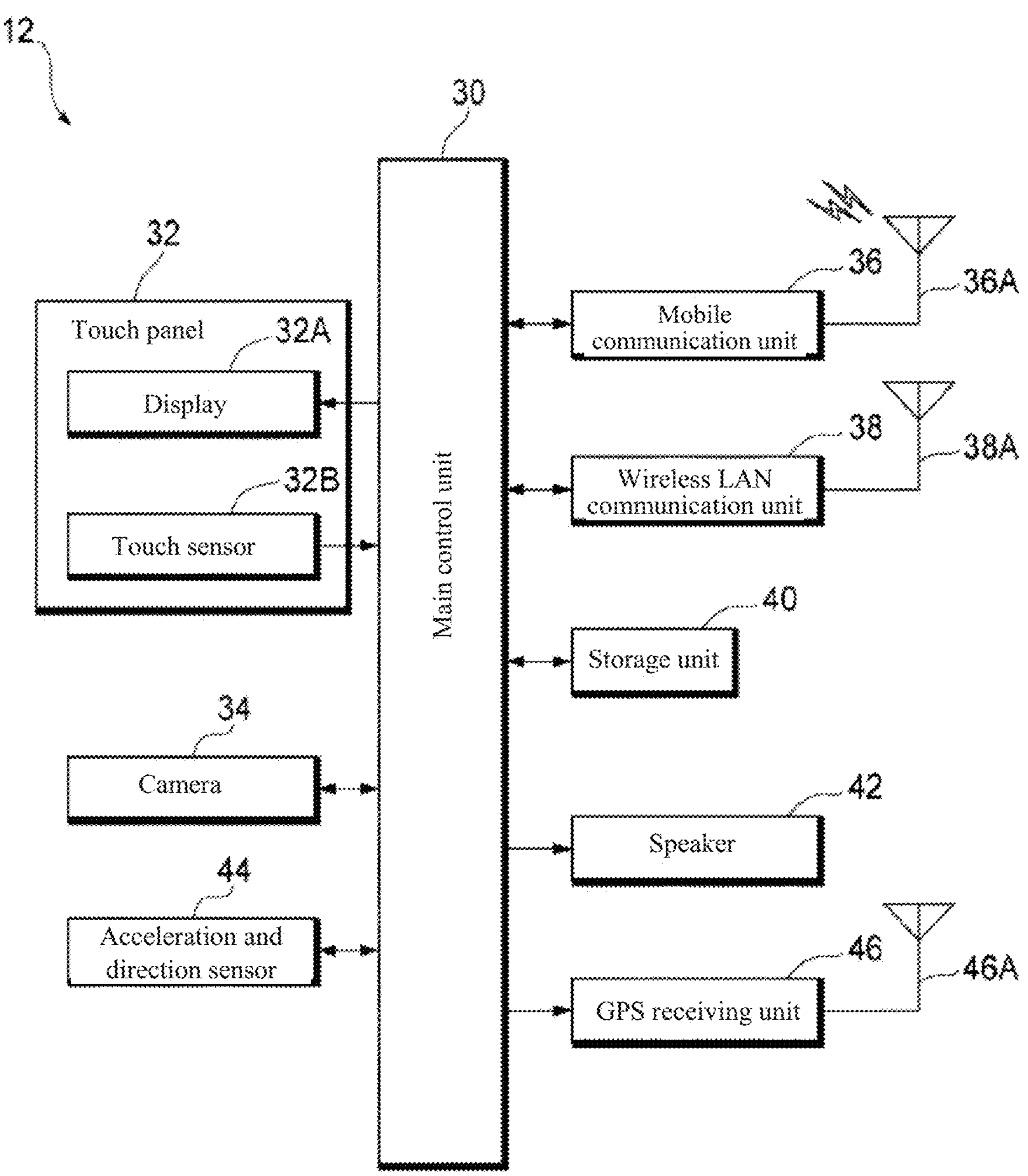
FIG. 3 is a block diagram showing an example of the hardware configuration of a smartphone, as the user terminal shown in FIG. 1.

FIG. 3 is a block diagram showing an example of the hardware configuration of a smartphone as the user terminal 12 shown in FIG. 1.

As shown in FIG. 3, the user terminal 12 comprises a main control unit (or hardware processor) 30, a touch panel 32, a camera 34, a mobile communication unit 36, a wireless LAN (local area network) communication unit 38, a storage unit 40, a speaker 42, an acceleration and direction sensor 44, and a GPS (global positioning system) receiving unit 46.

The main control unit 30 includes a CPU, a memory, and so forth. The touch panel 32, the camera 34, the mobile communication unit 36, the wireless LAN communication unit 38, the memory unit 40, the speaker 42, the acceleration and direction sensor 44, and the GPS receiving unit 46 are connected to the main control unit 30. The main control unit 30 has the function of controlling these connected devices.

The touch panel 32 has the functions of both a display device and an input device, and is made up of a display 32A that handles the display function, and a touch sensor 32B that handles the input function. The display 32A is constituted by an ordinary display device such as a liquid crystal display or an organic EL (electro-luminescence) display. The display 32A displays an augmented reality application execution screen generated by execution of the program 14, for example.

The touch sensor 32B is constituted by an element for detecting a touch operation on the screen displayed by the display 32A. The touch operation detection method employed by the touch sensor 32B can be any known method, such as a capacitance method, a resistive film method (pressure sensitive method), or an electromagnetic induction method. The touch sensor 32B receives the user's operation input by detecting an operation made with the user's finger, a stylus, or another such operator that is used to touch the screen. When the touch sensor 32B detects an operation with the user's finger, a stylus, etc., it detects the coordinates indicating the contact position on the screen, and outputs those coordinates to the main control unit 30. These coordinates indicating the position may be shown, for example, as coordinate values in an x-y plane on the screen displayed by the display 32A.

The camera 34 is an imaging device for capturing still and/or moving pictures and has a function of storing the captured results in the storage unit 40.

The mobile communication unit 36 has a function of connecting to a mobile communication network via an antenna 36A and communicating with other communication devices connected to this mobile communication network.

The wireless LAN communication unit 38 has a function of connecting to the communication network NT via the antenna 38A and communicating with other devices such as the server device 10 connected to the communication network NT.

The storage unit 40 stores various instructions including the program 14 and various information.

The speaker 42 has a function of outputting the sounds, etc. produced during the execution of the augmented reality application.

The acceleration and direction sensor 44 has a function of acquiring information used for calculating the orientation and inclination of a user terminal 12, and includes various sensors such as an electron magnetic compass that detects the earth's magnetism, a gyro compass, or an acceleration sensor.

The GPS receiving unit 46 has a function of receiving GPS signals for specifying the position of the user terminal 12 from a GPS satellite via the antenna 46A.

FIG. 3 only shows a part of the main hardware configuration included in the user terminal 12, and the user terminal 12 can include other components commonly found in smartphones, such as a microphone for inputting audio, a real-time clock, and a short-range wireless communication unit.

Functional Components

Figure 4:
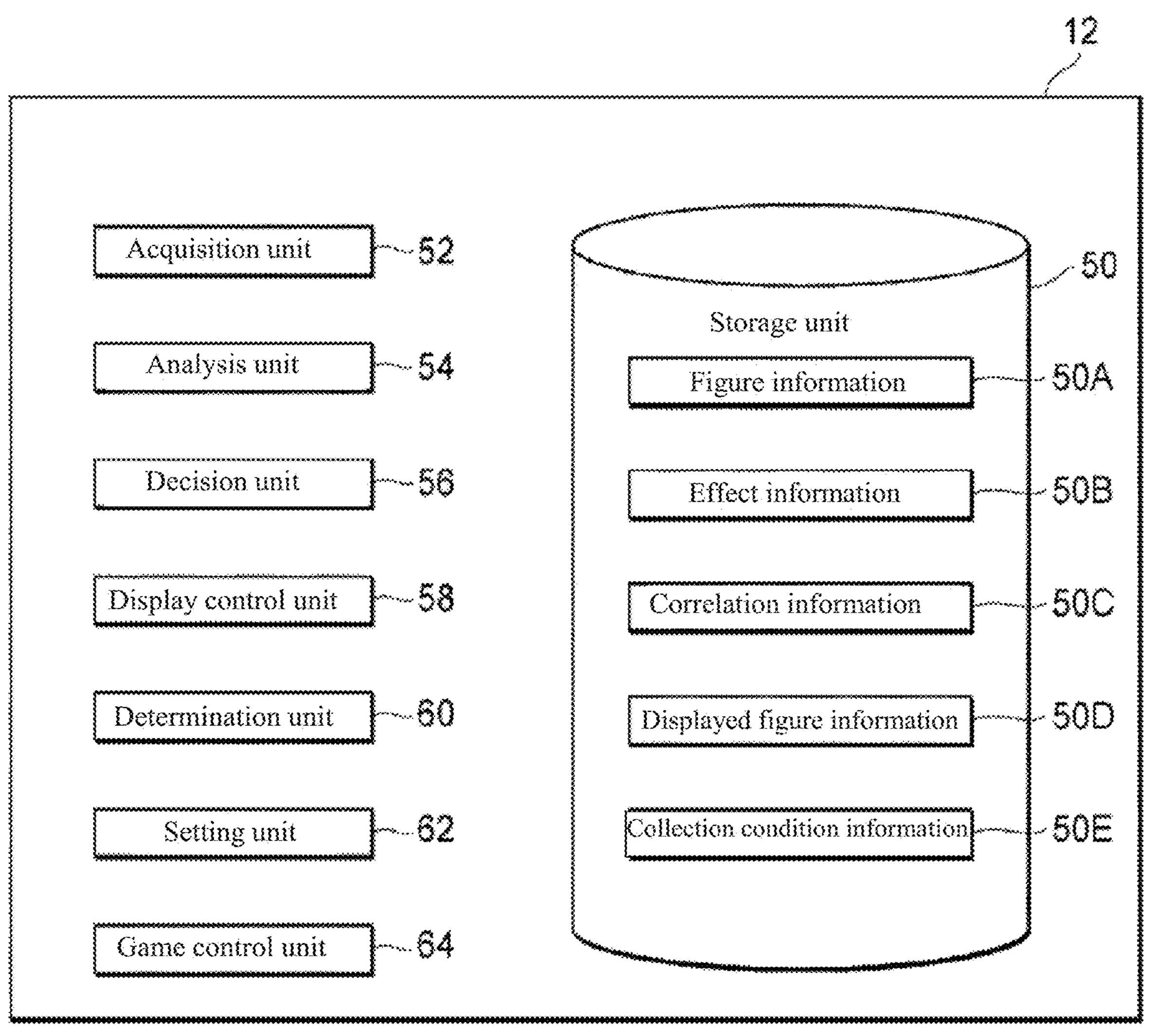
FIG. 4 is a block diagram showing an example of the functional components of a user terminal.

FIG. 4 is a block diagram showing an example of the functional components of the user terminal 12.

As shown in FIG. 4, the functional components of the user terminal 12 include a storage unit 50, an acquisition unit 52, an analysis unit 54, a decision unit 56, a display control unit 58, a determination unit 60, a setting unit 62, and a game control unit 64. These functional components are realized by executing a specific instruction(s) stored in the storage unit 40 under the control of the main control unit 30 and operating the various components of the user terminal 12 shown in FIG. 3. The server device 10 may include some or all of these functional components.

The storage unit 50 stores figure information 50A, effect information 50B, correlation information 50C, displayed figure information 50D, and collection condition information 50E.

Figure information 50A is information on a figure serving as an object to be captured by the camera 34. An image that includes a figure captured by the camera 34 will herein be referred to as a "captured image." The figure information 50A includes feature point data for the figure. The feature point data for the figure is acquired in advance from three-dimensional model data of the figure, a number of photographs, or the like. A plurality of pieces of feature point data for the figure are stored in association with the figure type. The figure type is identification information indicating what kind of figure it is, and is indicated, for example, by a product name, character name, genre name, figure ID, product ID, etc.

Also, the feature point data for a figure may be stored for each figure type and in association with the shape, orientation, and so forth of the figure. The figure shape is information on a three-dimensional shape or a planar shape when a three-dimensional figure is seen in plan view. The figure shape can be changed by moving the figure, attaching or detaching detachable parts of the figure, rearranging the parts, etc. Also, the orientation of the figure is information indicating how the arranged figure is oriented in a three-dimensional space. The orientation of the figure can also be changed by changing the arrangement of the figure or the figure shape.

Effect information 50B is information generated as additional information to be added to a captured image. The effect information 50B includes effect data configured as various kinds of digital content, such as images that include still and moving pictures, text, music, audio, and sound effects. If the effect data is image effect data, the effect data may include a background image to be superimposed (or superimposingly displayed) in the background of the figure, an image of a virtual object to be superimposed on the image of the figure itself, and so on. Effect data outputted by the display of image, text, etc., will also be referred to as "display effects" herein. Also, effect data outputted as music, voice, sound effects, or other such sounds shall be referred to as a "sound effect."

Figures 5, 6A:
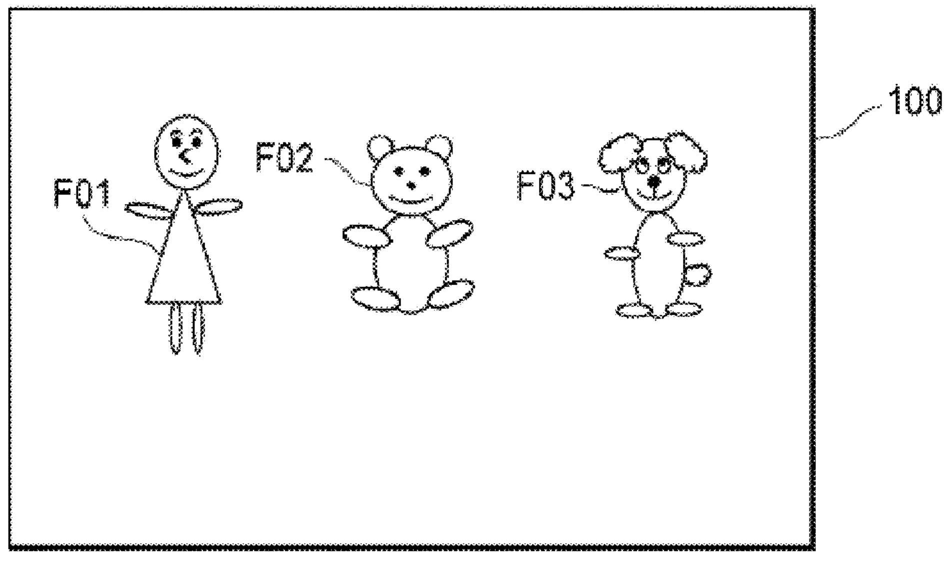
FIG. 5 is a diagram showing a configuration example of effect information stored in the storage means.
FIG. 6A is a diagram conceptually illustrating the disposition relationship.

FIG. 5 is a diagram showing a configuration example of the effect information 50B. As shown in FIG. 5, the effect information 50B is a data table that stores path names of effect data in association with effect IDs, which are identification information for the effect data. The path name of the effect data indicates the storage location of the effect data in the storage unit 40, etc. The effect ID and the effect data path name are not limited to a one-to-one correspondence, so one set of effect data may be associated with multiple effect IDs, and multiple pieces of effect data may be associated with one effect ID.

Correlation information 50C is information indicating the correlation between situation information and effect data. Situation information may be, for example, information on the situation of a figure included in a captured image, and is specific information that can be acquired by analyzing the captured image. In addition to the figure type and figure shape discussed above, situation information includes combinations of a plurality of figures, the disposition relationship of a plurality of figures, the disposition sequence of a plurality of figures, and so forth.

The combination of a plurality of figures is information indicating a combination of a plurality of figure types captured by the camera 34, that is, a combination of figure types included in the captured image. A combination of a plurality of figures will hereinafter also be simply referred to as a "combination."

The disposition relationship of a plurality of figures is information that indicates the disposition relationship of the figures within a captured image (capture range), and includes not only the position of each figure itself, but also the distance between figures, the orientation of each figure, combinations of orientations of the figures within the capture range, and so forth. The coordinates for calculating the position of each figure and the distance between figures can be the center coordinates of each figure, for example, but are not limited to this, and may instead be the coordinates of some other position in each figure. The disposition relationship of a plurality of figures will also be simply referred to hereinafter as the "disposition relationship." Also, the disposition sequence of a plurality of figures is information indicating a serial sequence of disposition relationships of the figures changing in a predetermined order in a case that the disposition relationships change. The disposition sequence of a plurality of figures will hereinafter also be referred to simply as the "serial sequence" or "disposition sequence."

The disposition relationship will now be conceptually described with reference to FIGS. 6A to 6D. FIGS. 6A to 6D are diagrams conceptually illustrating the disposition relationship. In FIGS. 6A to 6D, figures F01 to F03 included in a captured image 100 are illustrated two-dimensionally, but the figures F01 to F03 actually captured are three-dimensional objects.

As shown in FIGS. 6A to 6D, the figures F01 to F03 are disposed in an unlinked state, for example. An "unlinked state" refers to a state in which the objects are independent, without being physically directly connected to each other. Consequently, the figures F01 to F03 can be disposed in various orientations, with specific spacing in between them. The mutually unlinked state is not necessarily limited to what is shown in the drawings, and may include, for example, a state in which they are indirectly connected to each other via a specific connecting element, a state in which there are portions that overlap each other, and so forth.

In the disposition relationship shown in FIG. 6A, the figures F01 to F03 are all located side by side in the captured image 100. Also, the distance between the figures F01 to F03 may be 5 cm or less, for example. Also, each figure is oriented facing toward the front.

Figure 6B:
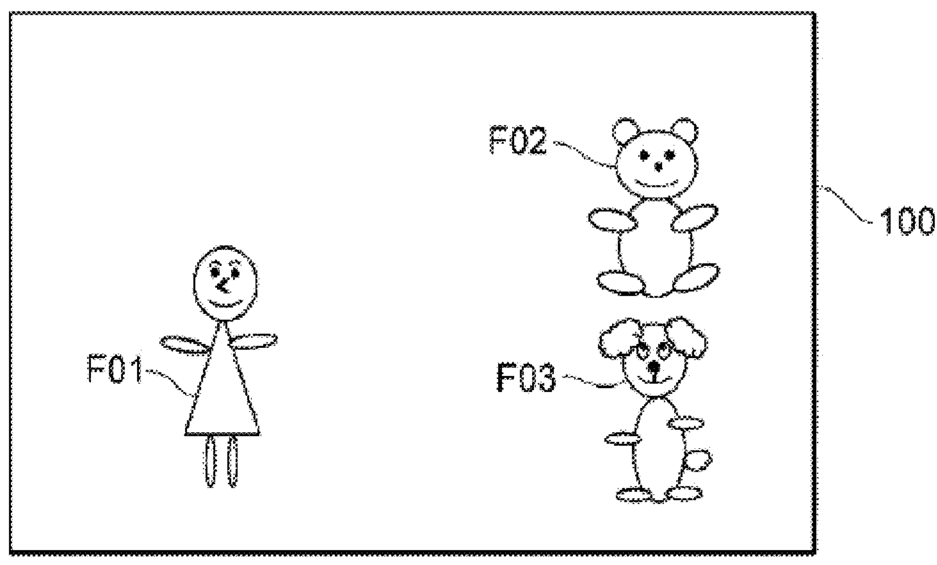
FIG. 6B is a diagram conceptually illustrating the disposition relationship.

In the disposition relationship shown in FIG. 6B, the figure F01 and the figures F02 and F03 are located side by side in the captured image 100. Also, the distance between the figure F02 and the figure F03 may be 5 cm or less, for example, whereas the distance between the figure F01 and the figures F02 and F03 may be 5 to 10 cm, for example. Also, each figure is oriented facing toward the front.

Figure 6C:
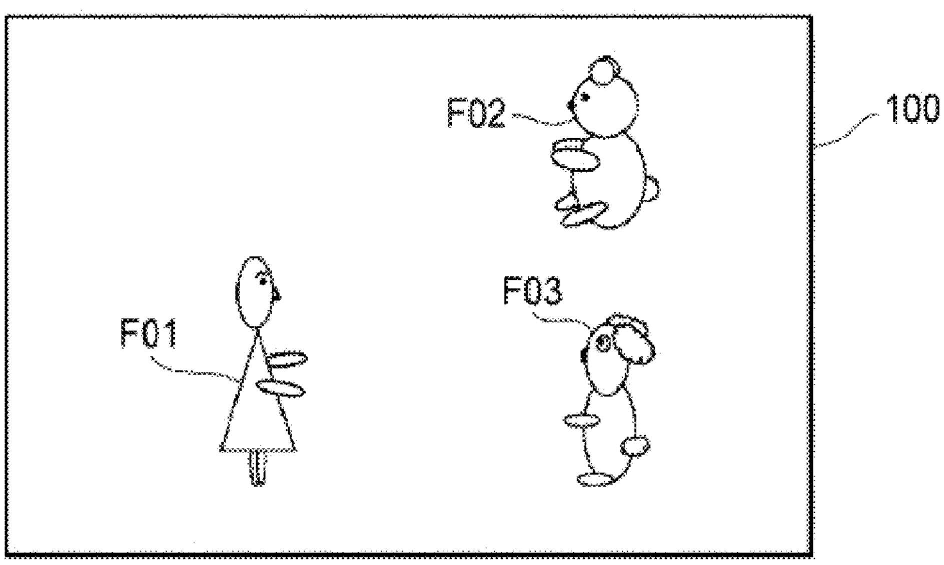
FIG. 6C is a diagram conceptually illustrating the disposition relationship.

In the disposition relationship shown in FIG. 6C, the figure F01 and the figures F02 and F03 are located side by side in the captured image 100. Also, the distance between the figure F02 and the figure F03 may be 5 cm or less, for example, whereas the distance between the figure F01 and the figures F02 and F03 may be 5 to 10 cm, for example. Also, the figure F01 and the figures F02 and F03 are facing each other.

Figures 6D, 7A:
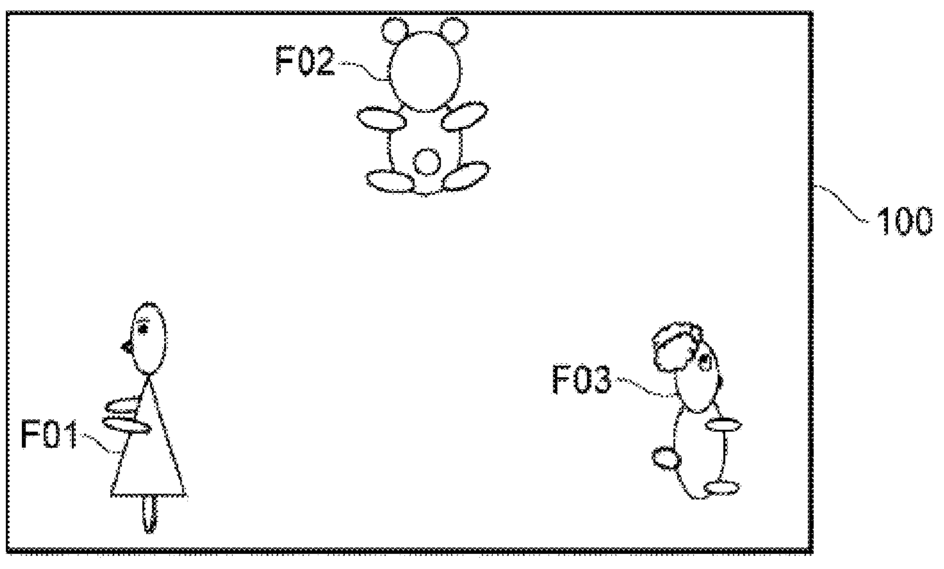
FIG. 6D is a diagram conceptually illustrating the disposition relationship.
FIG. 7A is a diagram showing a configuration example of the correlation information.

In the disposition relationship shown in FIG. 6D, the figures F01 to F03 are disposed in a triangular shape in the captured image 100. Also, the distance between the figures F01 to F03 may be 5 to 10 cm, for example. Also, the figures F01 to F03 all have their backs facing each other.

As discussed above, a specific disposition relationship is configured depending on the positions of the figures, the distances between the figures, the orientations of the figures, and so on in the captured image 100. Also, if the disposition relationship changes as a result of the user changing the dispositions of the figures, for example, a disposition sequence is configured that shows a serial sequence of disposition relationships of the figures that have been changed in the predetermined order. For example, if the disposition relationship shown in FIG. 6B changes to the disposition relationship shown in FIG. 6C within a preset specific length of time, a disposition sequence is configured that includes the disposition relationship shown in FIG. 6B and the disposition relationship shown in FIG. 6C in the order of change.

FIGS. 7A to 7E are diagrams showing configuration examples of the correlation information 50C. As shown in FIGS. 7A to 7E, the correlation information 50C is a data table that stores effect IDs that are associated with situation information (figure type, shape, combination, disposition relationship, and disposition sequence).

The correlation information 50C shown in FIG. 7A stores effect IDs that are associated with the figure type. Also, the correlation information 50C shown in FIG. 7B stores effect IDs that are associated with the figure shape. The correlation information 50C shown in FIG. 7B shows an example in which the figure type is "human character A," for example.

Also, the correlation information 50C shown in FIG. 7C stores effect IDs that are associated with combinations of a plurality of figures. Also, the correlation information 50C shown in FIG. 7D stores effect IDs that are associated with the disposition relationship of a plurality of figures. Also, the correlation information 50C shown in FIG. 7E stores effect IDs that are associated with the disposition sequence of a plurality of figures. The correlation information 50C in FIGS. 7D and 7E shows an example in which the combination is a set of three figure types, such as "F01, F02, and F03."

The pieces of correlation information 50C shown in FIGS. 7A to 7E are linked to each other by specific situation information, etc. For example, the storage unit 50 stores a plurality of pieces of correlation information 50C for the figure shape and effect ID as shown in FIG. 7B, linked to the figure type. The storage unit 50 also stores a plurality of pieces of correlation information 50C for the disposition relationship and effect ID as shown in FIG. 7D, and correlation information 50C for the disposition sequence and effect ID as shown in FIG. 7E, linked to combinations.

Returning to FIG. 4, the displayed figure information 50D is information indicating a displayed figure (displayed object). A displayed figure is a figure included in the captured image 100 that has been displayed on the display 32A with effect data added. For example, when the captured image 100 to which effect data has been added by the display control unit 58 is displayed on the display 32A, the storage unit 50 stores the types or number of a plurality of figures included in the captured image 100 as displayed figure information 50D.

Collection condition information 50E is information indicating collection conditions related to the collection of a plurality of captured figures. The collection condition information 50E may include, for example, "there are five figure types," "there are three animal figures," "there are one or more figures whose type is ΔΔ," "there are ten figures," and various other such conditions regarding the type and number of figures.

When a plurality of figures are captured by the camera 34 while the augmented reality application is actuated on the user terminal 12, the acquisition unit 52 sequentially acquires those captured images 100. The acquisition unit 52 sequentially outputs the acquired captured images 100 to the analysis unit 54 and the display control unit 58.

The analysis unit 54 sequentially analyzes the captured images 100 acquired by the acquisition unit 52 and acquires the types of the figures included in the capture range of the captured images 100. The analysis unit 54 functions as an acquisition unit for acquiring the types of a plurality of figures as identification information of the figures based on the captured images 100.

For example, the analysis unit 54 analyzes the captured images 100 using a known image analysis technique, and thereby detects the feature points of the figures. The analysis unit 54 acquires the figure types corresponding to the detected feature points based on the detected feature points and the figure information 50A stored in the storage unit 50. More specifically, the analysis unit 54 extracts feature point data whose degree of similarity to a detected feature point is greater than or equal to a specific value from among the feature point data stored in association with the figure types. The analysis unit 54 then acquires the figure types corresponding to that feature point data.

Also, the analysis unit 54 identifies the combination of figures included in a captured image 100 based on the acquired figure types. For example, if the acquired figure types are "human character A," "bear," and "dog," the analysis unit 54 identifies these as a combination of a set of three figures consisting of "human character A," "bear," and "dog." Also, if the acquired figure types have common attributes, such as being characters from a specific animation, those attributes themselves may be identified as a combination.

Also, when the figure types are acquired, the analysis unit 54 may further detect the precise feature points related to the shape and orientation of the figures. In this case, the analysis unit 54 acquires information indicating the shape and orientation of the figures corresponding to the detected feature points based on the detected feature points related to shape and orientation, and the figure information 50A stored in the storage unit 50. For example, the analysis unit 54 extracts feature point data whose degree of similarity to a detected feature point is equal to or greater than a specific value from among the feature point data stored in association with the shape and orientation of the figures for each figure type. The analysis unit 54 then acquires information indicating the shape and orientation of the figures corresponding to the feature point data.

Also, the analysis unit 54 analyzes the captured image 100 using a known image analysis technique, and acquires the disposition relationship of the figures in the captured image 100. That is, the analysis unit 54 acquires the position of each figure, the distance between the figures, the orientation of each figure, etc. For example, the analysis unit 54 acquires the position of each figure, the distance between the figures, or the orientation of each figure based on the feature points of each figure detected from the captured image 100. More specifically, the analysis unit 54 finds the external shape of each figure from the detected feature points of each figure, identifies the positional coordinates included in that external shape, and calculates the difference between the identified positional coordinates to acquire the position of each figure and the distance between the figures. Also, the analysis unit 54 extracts feature point data having a degree of similarity equal to or greater than a specific value with the feature points stored in association with the orientation of the figures. Then, the analysis unit 54 acquires the orientation of the figures corresponding to the feature point data.

Also, the analysis unit 54 acquires a disposition sequence based on the disposition relationship when the disposition relationship has changed within a specific period, for example. For example, when the orientation of each of the figures F01 to F03 has changed from facing forward to facing each other, that is, going from the disposition relationship shown in FIG. 6B to the disposition relationship shown in FIG. 6C, the analysis unit 54 acquires information including the disposition relationship shown in FIG. 6B and the disposition relationship shown in FIG. 6C in their order of change as a disposition sequence. The analysis unit 54 outputs the image analysis information acquired as a result of the analysis to the decision unit 56.

The decision unit 56 determines effect data as additional information to be added to the captured image 100 based on the image analysis information outputted from the analysis unit 54. First, the decision unit 56 refers to the correlation information 50C and identifies the effect ID corresponding to the outputted image analysis information. Next, the decision unit 56 refers to the effect information 50B and identifies the path name of the effect data corresponding to the identified effect ID. Consequently, the decision unit 56 determines the effect data stored at the storage location indicated by the path name as effect data to be added to the captured image 100. The decision unit 56 then acquires the effect data stored at the storage location indicated by the path name, and outputs the acquired effect data to the display control unit 58.

More specifically, when the figure type is outputted from the analysis unit 54, the decision unit 56 refers to the correlation information 50C in FIG. 7A and identifies the effect ID corresponding to that figure type. Also, when the figure shape is outputted from the analysis unit 54, the decision unit 56 refers to the correlation information 50C in FIG. 7B and identifies the effect ID corresponding to that figure shape. Also, when both the figure type and figure shape are outputted from the analysis unit 54, the decision unit 56 refers to the correlation information 50C in FIG. 7B linked to that figure type and identifies the effect ID corresponding to that figure type and figure shape.

Also, when a combination is outputted from the analysis unit 54, the decision unit 56 refers to the correlation information 50C in FIG. 7C and identifies the effect ID corresponding to that combination. Also, when a disposition relationship is outputted from the analysis unit 54, the decision unit 56 refers to the correlation information 50C in FIG. 7D and identifies the effect ID corresponding to that disposition relationship. Also, when both a combination and a disposition relationship are outputted from the analysis unit 54, the decision unit 56 refers to the correlation information 50C in FIG. 7D linked to that combination and identifies the effect ID corresponding to that combination and disposition relationship. That is, the decision unit 56 identifies the effect ID based on the combination and disposition relationship.

Also, when there is a change in the image analysis information, the decision unit 56 determines a plurality of pieces of effect data corresponding to the changing image analysis information. For example, when there is a change in the figure shape, the decision unit 56 refers to the correlation information 50C in FIG. 7B in the same manner as discussed above and identifies a plurality of effect IDs corresponding to the changing shape. Also, when there is a change in the disposition relationship, the decision unit 56 refers to the correlation information 50C in FIG. 7D in the same manner as discussed above and identifies a plurality of effect IDs corresponding to the changing disposition relationship.

Also, when a disposition sequence is outputted from the analysis unit 54, the decision unit 56 determines whether that disposition sequence is a specific disposition sequence stored in the storage unit 50. The decision unit 56 may refer, for example, to the correlation information 50C in FIG. 6E, which is linked to the combination outputted from the analysis unit 54. Then, if the outputted disposition sequence corresponds to a disposition sequence stored in the corresponding correlation information 50C, the decision unit 56 makes an affirmative decision. A case in which the outputted disposition sequence corresponds to a disposition sequence stored in the corresponding correlation information 50C is not limited to a case in which the disposition sequences coincide with each other. For example, the disposition sequences may be within a specific range of similarity to each other. When an affirmative determination is made, the decision unit 56 identifies the effect ID corresponding to that specific disposition sequence.

Also, the decision unit 56 determines the position and size of the effect data to be added to the captured image 100 based on the disposition relationship outputted from the analysis unit 54. That is, the decision unit 56 determines the position where the display effect is superimposed on the captured image 100, and the size of the display effect that is superimposed.

For example, if the disposition relationship is such that the figures F01 to F03 are arranged side by side as shown in FIG. 6A, the decision unit 56 determines the position and size of display effects in the captured image 100 so that the positions and sizes overlap as background for all the figures F01 to F03. Also, if the disposition relationship is such that the figure F01 and the figures F02 and F03 are facing each other as shown in FIG. 6C, the decision unit 56 determines the position and size of the display effects in the captured image 100 so that they will fit between the figure F01 and the figures F02 and F03.

Also, in addition to or instead of the disposition relationship, the decision unit 56 may determine the position and size of the display effects in the captured image 100 based on other image analysis information, such as a combination of a plurality of figures. For example, when the combination is a combination of specific characters, the decision unit 56 determines a position and size that will be appropriate for that combination. An appropriate position and size for the combination may be, for example, one that fits between the figures in the case of a combination of characters that are enemies with each other, or one that overlaps as a background of the figures in the case of a combination of characters that are friends with each other. Also, for example, if the combination is an attribute indicating a character of a specific animation, examples include a position and size that allow the reenactment of a scene appearing in that animation. Also, the decision unit 56 may determine either the position or the size of the display effect in the captured image 100, rather than both the position and the size.

Also, the decision unit 56 may determine not only the display effect but also the addition mode in which various kinds of effect data are added to the captured image 100, based on image analysis information such as disposition relationships and combinations. For example, the decision unit 56 may determine the volume of a sound effect, the direction in which a sound is emitted, etc., based on the disposition relationship or combination. The specific decision method is the same as for display effects.

The method for determining the effect data employed by the decision unit 56 can be changed depending on whether the mode setting of the augmented reality application is set to the normal effect mode or the special effect mode by the designer or user, for example. For example, the decision unit 56 may change the correlation information 50C that is referred to in specifying the effect ID, depending on whether the normal effect mode or the special effect mode has been set. The normal effect mode or the special effect mode may be set before actuating the augmented reality application, or may be switched during actuation.

For example, if the normal effect mode has been set, the decision unit 56 may identify the effect ID by referring to the correlation information 50C shown in FIG. 7A or 7B. On the other hand, if the special effect mode has been set, for example, the decision unit 56 may identify the effect ID by referring to the correlation information 50C shown in FIGS. 7C to 7E.

FIG. 8 is a table illustrating types of special effect modes. As shown in FIG. 8, the special effect mode "A" is a "combination mode," in which effect data corresponding to a combination is added to the captured image 100. The special effect mode "B" is a "figure disposition mode," in which effect data corresponding to the disposition relationship or disposition sequence is added to the captured image 100. The special effect modes "C" to "E" will be described in the second embodiment.

When the special effect mode is set to ON, one or more of the special effect modes shown in FIG. 8 may be selected and set. The decision unit 56 may change the referenced correlation information 50C depending on the one or more modes selected from among the special effect modes. That is, the method for determining the effect data may be changed depending on the type of mode selected as the special effect mode.

For example, if the special effect mode "A" is selected, the decision unit 56 identifies the effect ID by referring to the correlation information 50C shown in FIG. 7C. On the other hand, if the special effect mode "B" is selected, for example, the decision unit 56 identifies the effect ID by referring to the correlation information 50C shown in FIG. 7D or 7E. Also, if the special effect modes "A" and "B" are both selected, for example, the decision unit 56 may identify the effect ID by referring to the correlation information 50C shown in FIG. 7D or 7E linked to the combination outputted from the analysis unit 54.

Returning to FIG. 4, the display control unit 58 controls the display 32A to display the captured image 100 acquired by the acquisition unit 52. Here, the display control unit 58 adds the effect data outputted by the decision unit 56 to the captured image 100 and displays the resulting captured image 100. For example, if the effect data is a display effect, the display control unit 58 may display the captured image 100 with the display effect superimposed at the position and size determined by the decision unit 56. Also, if the effect data is a sound effect, for example, the display control unit 58 may display the captured image 100 while outputting the sound effect at the volume and direction determined by the decision unit 56.

Also, if there is a change in the shape or disposition relationship of the figures, the display control unit 58 switches the effect data to be added to the captured image 100 to one of the pieces of effect data determined by the decision unit 56 according to this change. Also, when a specific disposition sequence is configured, the display control unit 58 adds effect data corresponding to that disposition sequence and displays the resulting captured image 100.

The determination unit 60 determines whether a displayed figure stored as the displayed figure information 50D satisfies a specific condition. For example, the determination unit 60 may determine whether the type or number of displayed figures satisfies at least one of the collection conditions stored as collection condition information 50E. The determination unit 60 may make this determination for all of the collection conditions or for at least one collection condition selected by the designer or the user. The determination unit 60 outputs this determination result to the setting unit 62.

The setting unit 62 performs setting to change or add effect data stored in the storage unit 50 when a displayed figure stored as the displayed figure information 50D satisfies a specific condition. For instance, if the type or number of displayed figures satisfies a collection condition stored in the collection condition information 50E, that is, if the determination unit 60 makes an affirmative determination, the setting unit 62 changes or adds at least one of the pieces of effect data stored in the storage unit 50. Changing effect data means changing the effect data by editing or modifying the effect data itself. Adding effect data means storing new effect data in the storage unit 40 apart from the original effect data, and storing the storage location as the effect information 50B.

The game control unit 64 controls a specific game based on the effect data added to the captured image 100 by the display control unit 58. The game control unit 64 may coordinate this effect data within a specific video game or the like by reading and setting the information indicated by the effect data into the video game, for example. For example, if a display effect of an item related to a video game, such as a weapon or equipment, is displayed in a captured image 100 of a figure of a character in a video game, the game control unit 64 may make a setting such that the item will be owned by a character in the video game.

Flow of Processing

Figure 9:
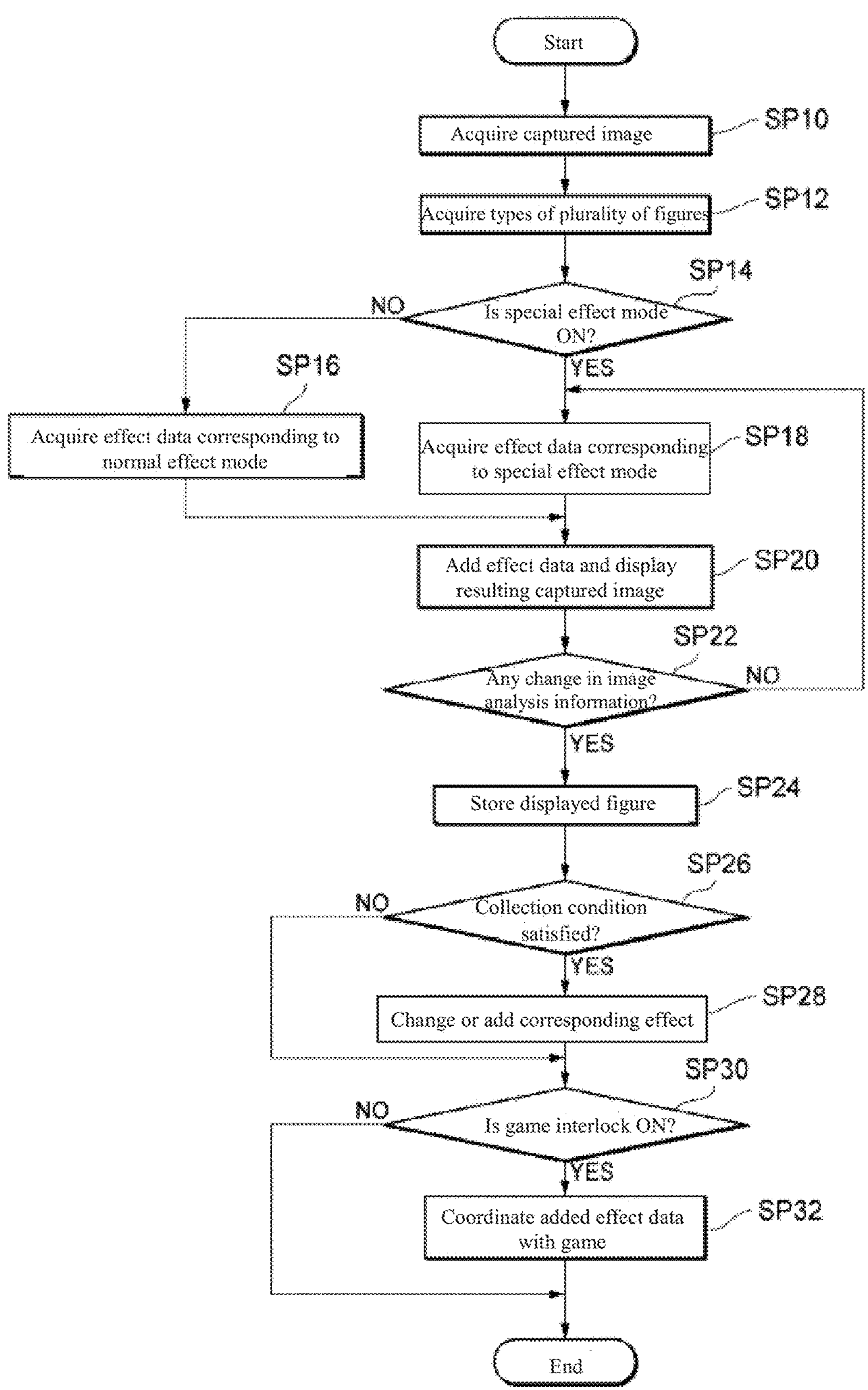
FIG. 9 is a flowchart showing an example of the flow of processing performed by the functional components shown in FIG. 4 in the augmented reality system according to the first embodiment.

FIG. 9 is a flowchart showing an example of the flow of processing performed by the functional components shown in FIG. 4 in the augmented reality system 1 according to the first embodiment. The content and order of the processing shown in FIG. 9 can be changed as appropriate. The processing in FIG. 9 may be started, for example, at the point when the user starts up the augmented reality application on the user terminal 12.

Step SP10

When the user points the camera 34 of the user terminal 12 at a plurality of figures, the acquisition unit 52 sequentially acquires the captured images 100 captured by the camera 34. The processing then moves to the processing of step SP12.

Step SP12

The analysis unit 54 sequentially analyzes the captured image 100 acquired in the processing of step SP10 and acquires the types of a plurality of figures. Also, the analysis unit 54 may acquire the shapes of a plurality of figures by analysis of the captured image 100. The processing then moves to the processing of step S14.

Step SP14

The decision unit 56 determines whether the special effect mode is ON. If the determination is negative, the processing moves to the processing of step SP16. On the other hand, if the determination is affirmative, the processing moves to the processing of step SP18.

Step SP16

The decision unit 56 acquires effect data corresponding to the normal effect mode. That is, the decision unit 56 acquires effect data corresponding to the figure types and figure shapes. For example, the decision unit 56 identifies the effect IDs corresponding to the figure types and figure shapes by referring to the correlation information 50C in FIGS. 7A and 7B related to the figure types and figure shapes acquired in the processing of step SP12. The decision unit 56 then refers to the effect information 50B in FIG. 5, identifies the effect data path corresponding to the identified effect ID, and acquires the effect data stored at the storage location indicated by the effect data path. The processing then moves to the processing of step SP20.

Step SP18

The decision unit 56 acquires effect data corresponding to the special effect mode. For example, when both special effect modes "A" and "B" are selected, the decision unit 56 acquires effect data corresponding to the combination and disposition relationship. The processing then moves to the processing of step SP20.

Step SP20

The display control unit 58 sequentially displays the captured image 100 acquired in the processing of step SP12 on the display 32A. Here, when the effect data is acquired in the processing of step SP16 or step SP18, the display control unit 58 adds this acquired effect data to the captured image 100 and sequentially displays the resulting captured images 100. The processing then moves to the processing of step SP22.

Step SP22

The analysis unit 54 determines whether there is no change in the image analysis information acquired as the analysis result. The analysis unit 54 determines, for example, whether the disposition relationship has not changed within a specific length of time. If this determination is negative, the processing returns to step SP18, and the processing of steps SP18 and SP20 is repeatedly executed. Consequently, in the processing of step SP20, the display control unit 58 switches the effect data added to the captured image 100 to one of the pieces of effect data acquired in the processing of step SP18 according to the change in the disposition relationship. On the other hand, if the determination is affirmative, the processing moves to the processing of SP24.

Step SP24

The storage unit 50 stores the type or number of figures included in the captured image 100 displayed on the display 32A in the processing of step SP20, that is, the type or number of figures whose type was acquired in the processing of step SP12, as the displayed figure information 50D. The processing then moves to the processing of step SP26.

Step SP26

The determination unit 60 determines whether the type or number of figures stored as the displayed figure information 50D satisfies at least one collection condition stored in the collection condition information 50E. If the determination is affirmative, the processing moves to the processing of step SP28. If the determination is negative, the processing moves to the processing of step SP30.

Step SP28

The setting unit 62 changes or adds the effect data stored in the storage unit 50. The processing then moves to the processing of step SP30.

Step SP30

The game control unit 64 determines whether the game interlock setting is ON. If the determination is affirmative, the processing moves to the processing of step SP32. If this determination is negative, the series of processing shown in FIG. 9 ends.

Step SP32

The game control unit 64 coordinates the effect data added to the captured image 100, that is, the effect data acquired in the processing of step SP16 or step SP18, with the game. Then, the series of processing shown in FIG. 9 ends.

Figure 10:
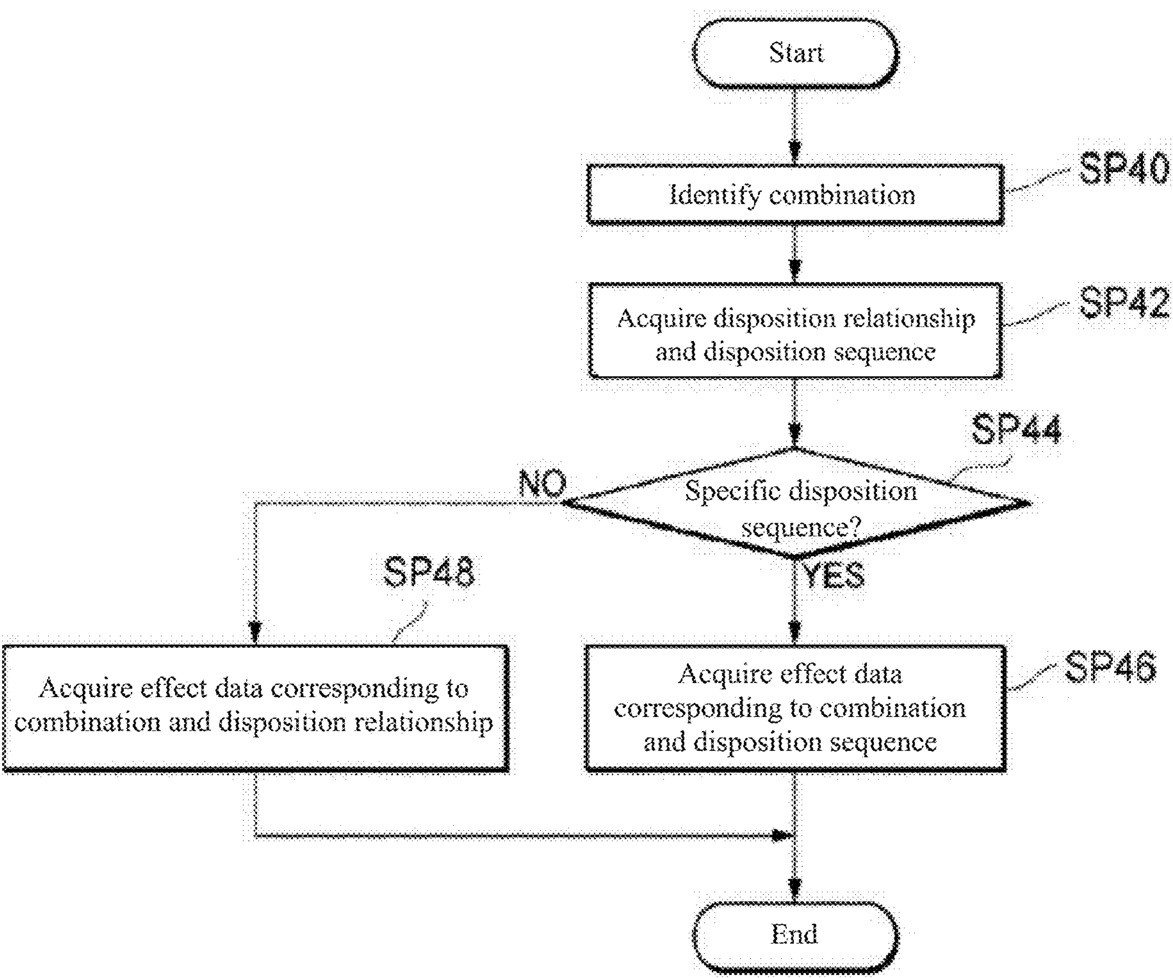
FIG. 10 is a flowchart showing an example of the flow of processing in step SP18 in FIG. 9.

FIG. 10 is a flowchart showing an example of the flow of processing in step SP18 in FIG. 9.

Step SP40

The analysis unit 54 identifies a combination of a plurality of figures based on a plurality of the figure types acquired in the processing of step SP12. The processing then moves to the processing of step SP42.

Step SP42

The analysis unit 54 acquires the disposition relationship of a plurality of figures by sequentially analyzing the captured images 100 acquired in the processing of step SP10. Also, the analysis unit 54 acquires a disposition sequence when there is a change in the disposition relationship. The processing then moves to the processing of step SP44.

Step SP44

When a disposition sequence is acquired in the processing of step SP42, the decision unit 56 refers to the correlation information 50C of FIG. 7E linked to the combination specified in the processing of step SP40. The decision unit 56 then determines whether the acquired disposition sequence is a specific disposition sequence stored in the correlation information 50C. If the determination is affirmative, the processing moves to the processing of step SP46. If the determination is negative, the processing moves to the processing of step SP48. Also, even if no disposition sequence is acquired in the processing of step SP42, the processing moves to the processing of step SP48.

Step SP46

The decision unit 56 identifies the effect ID corresponding to the specific disposition sequence for which an affirmative determination was made in the processing of step SP44. The decision unit 56 then refers to the effect information 50B in FIG. 5 and identifies the effect data path corresponding to the identified effect ID. The decision unit 56 then acquires the effect data stored at the storage location indicated by the effect data path. Then, the series of processing shown in FIG. 10 ends.

Step SP48

The decision unit 56 refers to the correlation information 50C in FIG. 7D linked to the combination specified in the processing of step SP40. The decision unit 56 then identifies the effect ID corresponding to the disposition relationship acquired in the processing of step SP42. The decision unit 56 then refers to the effect information 50B in FIG. 5 and identifies the effect data path corresponding to the identified effect ID. The decision unit 56 then acquires the effect data stored at the storage location indicated by the effect data path. Then, the series of processing shown in FIG. 10 ends.

Screen Display Example

FIGS. 11A to 11E are diagrams showing examples of a captured image 100 displayed on the display 32A of the user terminal 12 under display control by the display control unit 58. In the examples shown in FIGS. 11A to 11E, a display effect is superimposed on the captured image 100 as effect data.

Figure 11A:
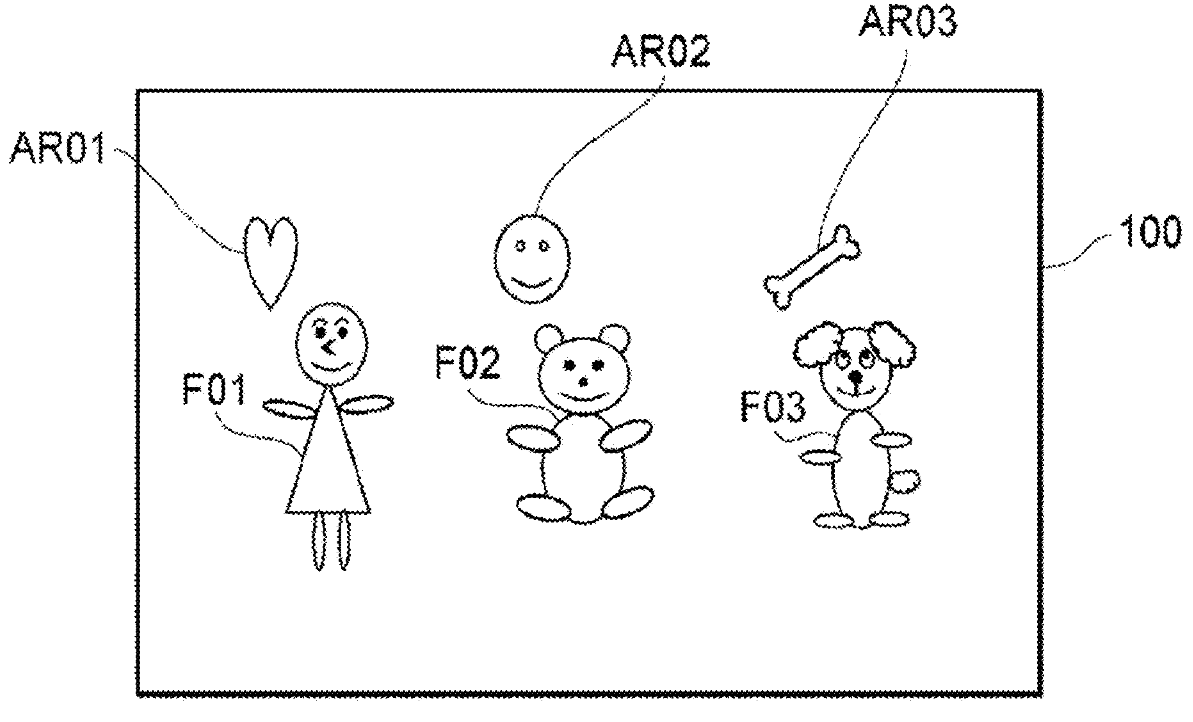
FIG. 11A is a diagram illustrating an example of a captured image displayed on the display of a user terminal under display control by the display control means.

The captured image 100 shown in FIG. 11A is an example in which a display effect is superimposed when the normal effect mode is set. When the normal effect mode is set, display effects AR01, AR02, and AR03 corresponding to the types and shapes of the figures F01, F02, and F03 are acquired in the processing of step SP16. In this case, as shown in FIG. 11A, the display effects AR01, AR02, and AR03 are superimposed on the captured image 100.

Figure 11B:
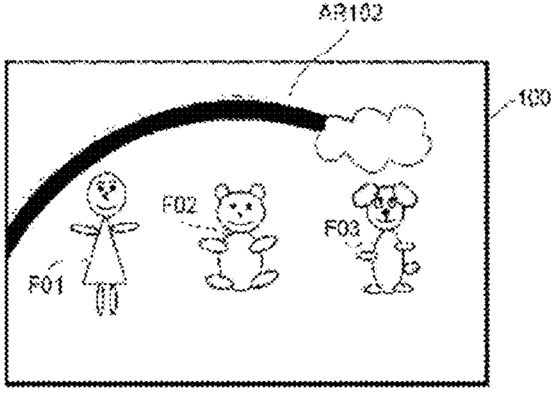
FIG. 11B is a diagram illustrating an example of a captured image displayed on the display of a user terminal under display control by the display control means.

On the other hand, the captured images 100 shown in FIGS. 11B to 11E show examples in which display effects are superimposed when the special effect mode is set. When "A" and "B" are selected as special effect modes, in the processing of step SP18, the display effect AR102 corresponding to the combination and disposition relationship of the figures F01, F02, and F03 is acquired. In this case, as shown in FIG. 11B, the display effect AR102 is superimposed on the captured image 100. The display effect AR102 may be, for example, a rainbow image serving as a background image, and may be displayed at a position and size spanning the figures F01 and F03 at both ends based on the disposition relationship.

Figure 11C:
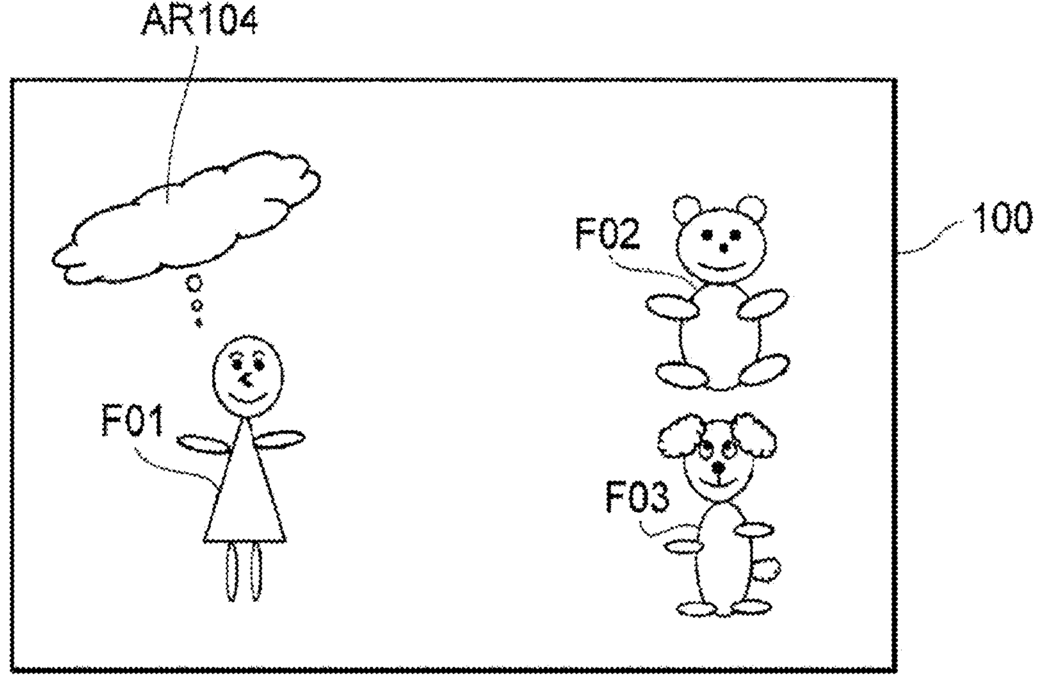
FIG. 11C is a diagram illustrating an example of a captured image displayed on the display of a user terminal under display control by the display control means.
Figure 11D:
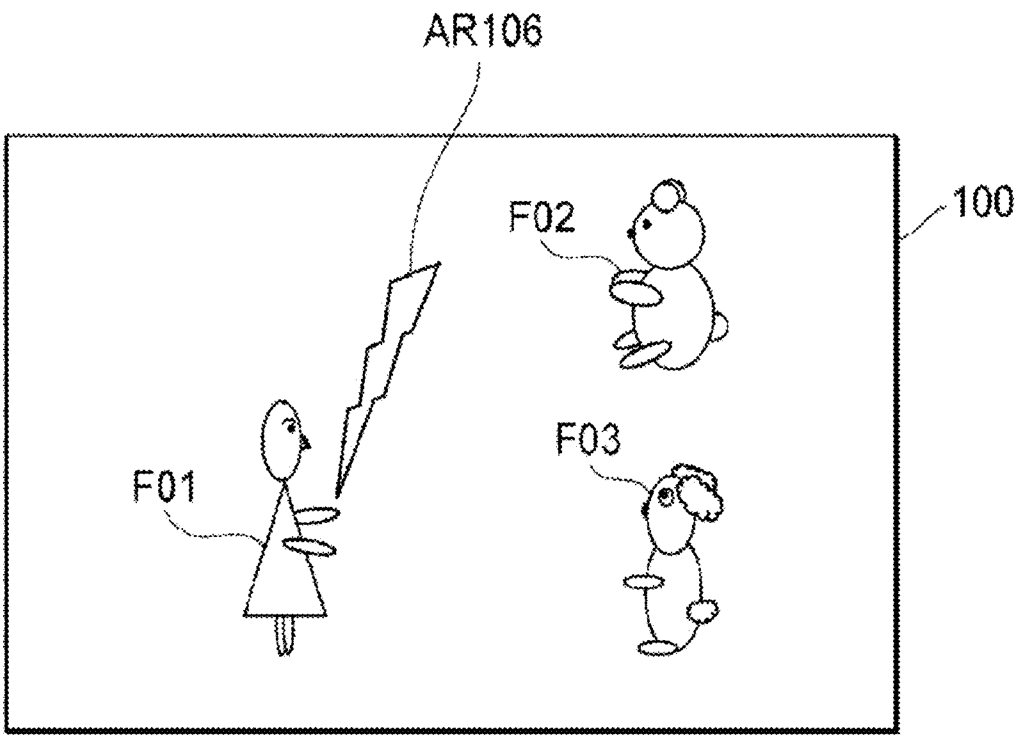
FIG. 11D is a diagram illustrating an example of a captured image displayed on the display of a user terminal under display control by the display control means.

For example, when the disposition relationship changes from FIG. 6B to FIG. 6C, the display effect AR104 corresponding to the disposition relationship in FIG. 6B and the display effect AR106 corresponding to the disposition relationship in FIG. 6C are acquired in the processing of step SP18. In this case, as shown in FIGS. 11C and 11D, the display effect in the captured image 100 is switched from the display effect AR104 to the display effect AR106, according to the change in the disposition relationship.

Also, if a specific disposition sequence is configured by changing the disposition relationship from FIG. 6B to FIG. 6C, for example, AR106 may be acquired as a display effect corresponding to the disposition sequence in the processing of step SP18. In this case, in response to the configuration of the disposition sequence, the display effect AR106 may be superimposed on the captured image 100 as shown in FIG. 11D.

Figure 11E:
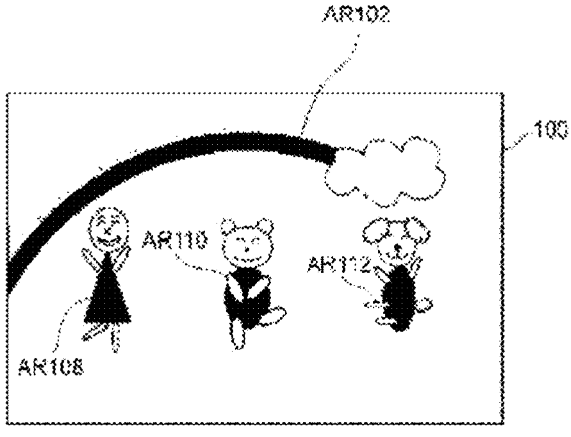
FIG. 11E is a diagram illustrating an example of a captured image displayed on the display of a user terminal under display control by the display control means.

Also, for example, at a specific point after the captured image 100 on which the display effect AR102 is superimposed on the display 32A as shown in FIG. 11B, images of the figures F01, F02, and F03 may be switched to display effects AR108, AR110, and AR112 of the respective virtual objects as shown in FIG. 11E. These display effects AR108, AR110, and AR112 may be, for example, moving images, and may be displayed while changing in a specific manner. After making these specific changes, the display effects AR108, AR110, and AR112 may be switched back to the images of the figures F01, F02, and F03 at a specific point, as shown in FIG. 11B. Also, the switching of these display effects is not limited to a specific point in time, and may be executed in response to a user operation or the like.

Technical Effect

In the first embodiment above, the user terminal 12 (a computer) is made to function as an acquisition unit 52 for acquiring the types of a plurality of figures based on the captured image 100 captured by the camera 34 when the figures have been captured by the camera 34; a decision unit 56 for determining effect data based on the combination of types of the objects acquired by the acquisition unit 52 and the disposition relationship of the figures in the captured image 100; and a display control unit 58 for adding the effect data determined by the decision unit 56 to the captured image 100 and displaying the resulting captured image 100. Also, the user terminal 12 according to the first embodiment comprises an acquisition unit 52 for acquiring the types of a plurality of figures based on the captured image 100 captured by the camera 34 when the figures have been captured by the camera 34; a decision unit 56 for determining effect data based on the combination of types of the objects acquired by the acquisition unit 52 and the disposition relationship of the figures in the captured image 100; and a display control unit 58 for adding the effect data determined by the decision unit 56 to the captured image 100 and displaying the resulting captured image 100.

With this configuration, it is possible to display the captured image 100 to which effect data corresponding to the combination and disposition relationship has been added. Consequently, by using a specific combination of a plurality of figures in a specific disposition relationship, the user can add unique effect data to the captured image 100 that can be obtained only with that combination and disposition relationship. Also, when the combination and disposition relationship are changing, different effect data can be added to the captured image 100. Thus, various kinds of effect data that match the situation can be added to the captured image 100, and the enjoyability of the effects in the captured image 100 can be enhanced.

Also, in this embodiment, the decision unit 56 determines the position or size of a display effect to be displayed on the captured image 100 based on at least the disposition relationship, and the display control unit 58 displays the captured image 100 to which the display effect has been added at the position or size determined by the decision unit 56.

With this configuration, the position or size of the display effect can be set to be suited to the disposition relationship or changed to any of various positions or sizes depending on the disposition relationship.

Also, in this embodiment, when there is a change in the disposition relationship, the decision unit 56 determines a plurality of pieces of effect data corresponding to the changing disposition relationship, and the display control unit 58 switches the effect data to be added to the image 100 to one of the pieces of effect data determined by the decision unit 56, according to the change in the disposition relationship.

With this configuration, the user can switch the effect data to be added to the captured image 100 to effect data corresponding to the disposition relationship by changing the disposition relationship of the figures. Consequently, various kinds of effect data can be added to the captured image 100, such as effect data that is unique to a specific disposition relationship, rather than effect data that simply follows changes in the disposition relationship, and the enjoyability of the effects in the captured image 100 can be enhanced.

Also, in this embodiment, when a disposition sequence indicating a serial sequence of disposition relationships of the figures in the order of change is a specific disposition sequence, the decision unit 56 determines effect data corresponding to the specific disposition sequence, and the display control unit 58 adds effect data corresponding to the specific disposition sequence determined by the decision unit 56 to the captured image 100 and displays the resulting captured image 100.

With this configuration, the user can add to the captured image 100 a reenactment scene of a specific animation, etc., as effect data corresponding to a specific disposition sequence by changing the disposition relationship of a plurality of figures over time so as to configure the specific disposition sequence. Consequently, unique effect data can be added to the captured image 100 due to the fact that a specific disposition sequence has been configured, and the enjoyability of the effects in the captured image 100 can be further enhanced.

Also, in this embodiment, the user terminal 12 (a computer) is further made to function as a storage unit 50 for storing, as displayed figures, information indicating a plurality of figures included in the captured image 100 when a plurality of pieces of effect data are stored and a captured image 100 to which effect data has been added is displayed by the display control unit 58; and a setting unit 62 for performing setting to change or add a plurality of pieces of effect data stored in the storage unit 50 when the displayed figures satisfy a specific collection condition.

With this configuration, options for effect data can be changed or added depending on the type, number, etc., of the displayed figures. Consequently, more diverse effect data can be added to the captured image 100. Also, a user who wants to change or add effect data options will attempt to collect figures so that the types or numbers of displayed figures will satisfy a specific collection condition, which makes the user want to collect more figures, which leads to the purchase of figures.

Also, in this embodiment, the figure shape can be varied by making the figure move, by attaching or detaching parts, or by rearranging parts, and when there is a change in the figure shape, the decision unit 56 determines a plurality of pieces of effect data corresponding to the change in the shape, and the display control unit 58 switches the effect data to be added to the captured image 100 to one of the pieces of effect data determined by the decision unit 56.

With this configuration, it is possible to switch to one of the pieces of effect data according to a change in the figure shape. Consequently, the user can add various kinds of effect data to the captured image 100 by changing the figure shape.

Also, in this embodiment, the effect data includes a background image to be superimposed in the background of the figure, and when the background image is superimposed on the captured image 100, the display control unit 58 switches the image of the figure captured by the camera 34 to an image of a virtual object, and after a specific change, the image of the virtual object is switched back to an image of the figure captured by the camera 34.

With this configuration, when the background image is superimposed in the background of the figure, the captured figure is switched to an image of a virtual object and a specific change is made, which makes the captured figure, which is actually in a stationary state, appear to be moving within the captured image 100.

Also, in this embodiment, the user terminal 12 (a computer) is further caused to function as the game control unit 64 that controls a specific game based on effect data added to the captured image 100 by the display control unit 58.

With this configuration, various kinds of effect data that match the situation can be linked to a specific video game. Also, a user who wants to coordinate effect data with a video game will first attempt to collect figures in order to add effect data to the captured image 100, which makes the user want to collect more figures, which leads to the purchase of figures.

Second Embodiment

Next, a second embodiment of the present invention will be described with reference to FIGS. 12 to 15. Components and functions that are the same as in the first embodiment will be numbered the same and may not be described again, and only the parts that are different from the first embodiment will be described in detail.

Functional Configuration

The augmented reality system according to the second embodiment, like the augmented reality system 1 according to the first embodiment, comprises a storage unit 50, an acquisition unit 52, an analysis unit 54, a decision unit 56, a display control unit 58, a determination unit 60, a setting unit 62, and a game control unit 64.

In the second embodiment, the method by which the decision unit 56 determines the effect data, and more specifically, the correlation information 50C referred to by the decision unit 56, is different from that in the first embodiment. In the second embodiment, the situation information in the correlation information 50C includes information related to real-world conditions, such as position, period, and weather, and information related to the imaging situation, such as the imaging position, imaging orientation, and camera work, in addition to or instead of the situation information in the first embodiment above (figure type, figure shape, combination, disposition relationship, disposition sequence).

The position mentioned as situation information is specific position information. This position may be a position in a three-dimensional space determined by a three-dimensional position vector, or a position determined by a two-dimensional position vector in a three-dimensional space, that is, a position in a two-dimensional plane. This position may be indicated, for example, by coordinates including latitude, longitude, and altitude, or a place name indicating a specific location. The altitude may be constant or may be changed depending on latitude or longitude.

The period and weather mentioned as situation information are information indicating a specific period or weather. The period is indicated by a name indicating a specific period, such as a season name such as spring, summer, fall, or winter, by a specific date and time, etc. The weather is indicated, for example, by a name indicating a specific weather such as clear or rainy, a precipitation amount, temperature, etc.

The imaging position and imaging orientation mentioned as situation information are information indicating the three-dimensional imaging position and imaging orientation of the camera 34 with respect to a three-dimensional figure. The imaging position is the relative position of the camera 34 with respect to the figure. The imaging orientation is the direction (azimuth) and inclination (elevation angle) of the camera 34 with respect to a figure. Also, the camera work as situation information is camera work using the camera 34 with respect to a figure, and is information indicating a serial sequence of the imaging position and imaging orientation that change in a predetermined order in a case that the imaging position and imaging orientation change.

Here, the imaging position and imaging orientation will be conceptually described with reference to FIGS. 12A to 12D. FIGS. 12A to 12D are diagrams conceptually illustrating the imaging position and imaging orientation. A single figure F01 is shown in FIGS. 12A to 12D, but capturing a single figure is not the only option, and a plurality of figures may be captured instead. When a plurality of figures are captured, the decision unit 56 may determine the effect data based on the imaging position and imaging orientation for each figure, or may recognize the figures as a single collective object and determine effect data based on the imaging position and imaging orientation with respect to that object.

Figure 12A:
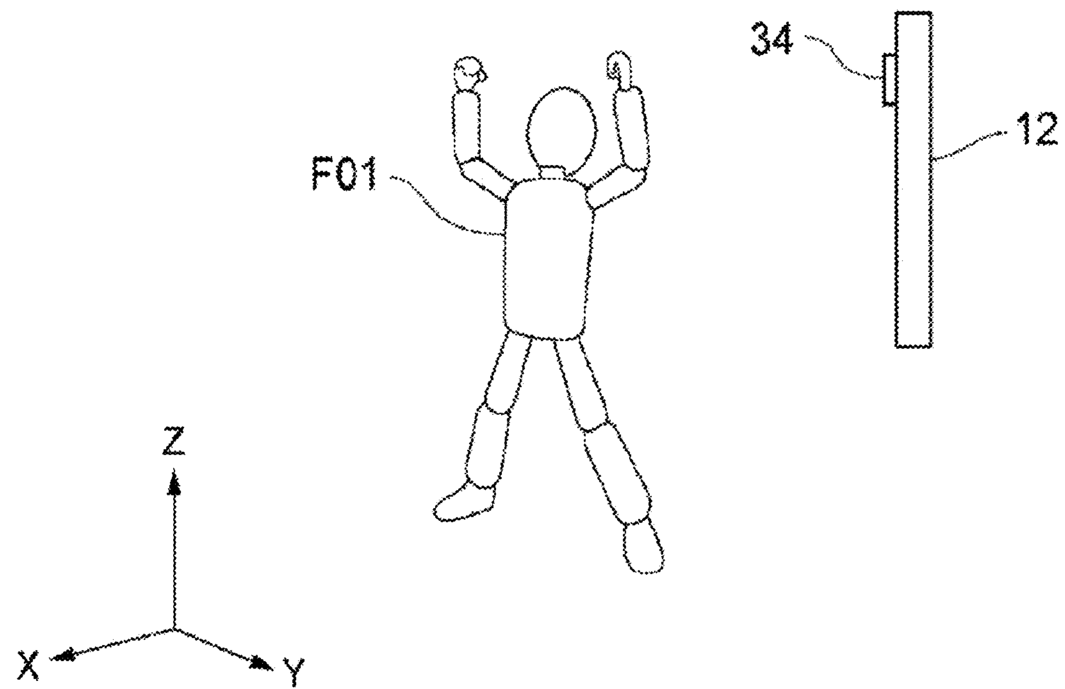
FIG. 12A is a diagram conceptually illustrating the imaging position and an imaging orientation.

In the imaging position and imaging orientation shown in FIG. 12A, the camera 34 of the user terminal 12 is positioned no more than 5 cm from the figure F01, and is pointed toward the left side of the figure F01, for example.

Figure 12B:
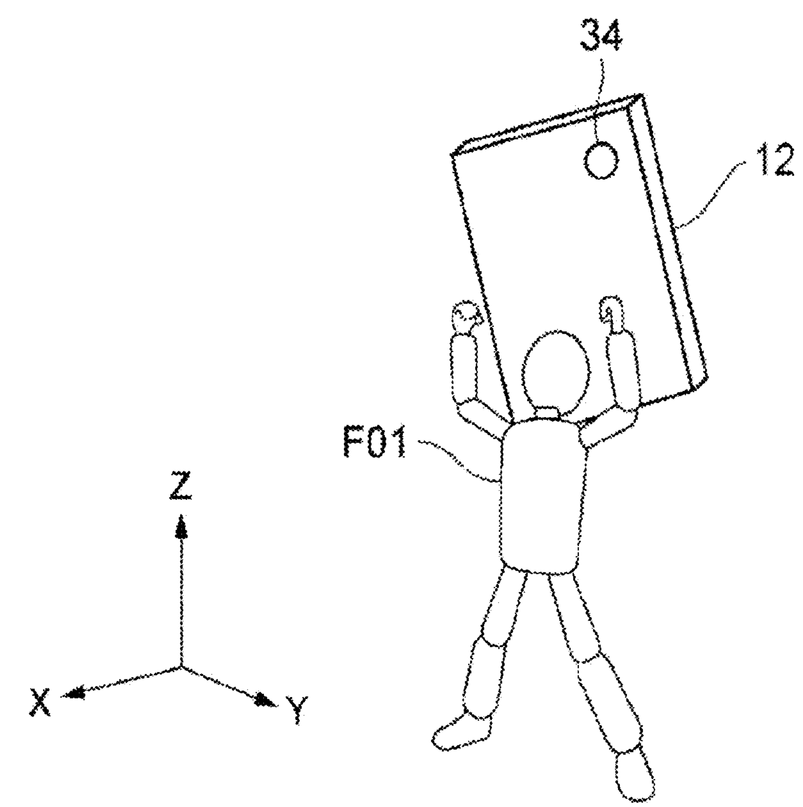
FIG. 12B is a diagram conceptually illustrating the imaging position and an imaging orientation.

In the imaging position and imaging orientation shown in FIG. 12B, the camera 34 of the user terminal 12 is positioned no more than 5 cm from the figure F01, and is pointed toward the back of the figure F01, for example.

In the imaging position and imaging orientation shown in FIG. 12C, the camera 34 of the user terminal 12 is positioned no more than 5 cm from the figure F01, and is pointed toward the right side of the figure F01, for example.

In the imaging position and imaging orientation shown in FIG. 12D, the camera 34 of the user terminal 12 is positioned 5 to 10 cm away from the figure F01, and is pointed toward the head of the figure F01 so as to view the figure F01 from overhead, for example.

As discussed above, a specific imaging position and imaging orientation are configured by the position, orientation, attitude, etc., of the camera 34 with respect to the figure F01. Also, when the user moves the camera 34 and changes the imaging position and imaging orientation, for example, this may constitute camera work that indicates a serial sequence of the imaging position and imaging orientation that change in the order of change. For example, the camera work may be configured such that, if the imaging position and imaging orientation change from FIG. 12A to FIG. 12B and then to FIG. 12C within a preset period of time, the imaging positions and imaging orientations shown in FIGS. 12A, 12B, and 12C are included in the order of change.

FIGS. 13A to 13D are diagrams showing configuration examples of the correlation information 50C according to the second embodiment. As shown in FIGS. 13A to 13D, the correlation information 50C stores effect IDs in association with situation information (position, period, weather, imaging position and imaging orientation, camera work). The correlation information 50C in FIGS. 13A to 13D shows examples in which the figure type is "human character A" in every case, for example.

The pieces of correlation information 50C shown in FIGS. 6A to 6E and FIGS. 13A to 13D are linked to each other by specific situation information or the like. For example, the storage unit 50 stores a plurality of pieces of the correlation information 50C shown in FIGS. 13A to 13D linked to the figure type. The storage unit 50 may store a plurality of pieces of the correlation information 50C shown in FIGS. 12A to 12D linked not only to the figure type but also to other situation information.

Also, in the second embodiment, the analysis unit 54 analyzes the captured image 100 using a known analysis technique, and acquires the imaging position and imaging orientation in addition to or instead of the image analysis information. The analysis unit 54 uses a known technique such as VSLAM (visual simultaneous localization and mapping) to estimate and acquire the imaging position and imaging orientation. With VSLAM, information acquired by a specific device such as the camera 34 or an acceleration and direction sensor 44 of the user terminal 12 is used to extract the feature points of the figure captured by the camera 34, and the feature points of the figure are tracked in real time to estimate the imaging position and imaging orientation.

Also, if there is a change in the imaging position and imaging orientation within a specific period, for example, the analysis unit 54 may acquire camera work based on the imaging position and imaging orientation. For example, if the imaging position and imaging orientation for the figure F01 change sequentially from FIG. 12A to FIG. 12B and then to FIG. 12C, the analysis unit 54 may acquire, as camera work, information including the imaging position and imaging orientation shown in FIGS. 12A, 12B, and 12C in the order of change.

Also, the decision unit 56 determines effect data based on the current location, the current period and weather, the imaging position and the imaging orientation, camera work, etc., in addition to or instead of the image analysis information described in the first embodiment.

For example, the decision unit 56 may acquire the current position and determine effect data based on the current position. In this case, the decision unit 56 refers to the correlation information 50C in FIG. 13A and identifies a specific position that matches the current position or is within an approximate range. The decision unit 56 then identifies the effect ID corresponding to the specific position. The current position acquired by the decision unit 56 is information indicating the current position when capturing the figure with the camera 34, that is, the position of the user terminal 12 that is capturing the captured image 100. This current position may be acquired based on, for example, a position measurement technique based on a GPS signal received by the GPS receiving unit 46 of the user terminal 12, or the IP address of the user terminal 12, or the like.

Also, the decision unit 56 acquires the current period and weather, and determines effect data based on the current period and weather. In this case, the decision unit 56 refers to the correlation information 50C in FIG. 13B and identifies a specific period and weather that match or are within an approximate range of the current period and weather. The decision unit 56 then identifies the effect ID corresponding to that specific period and weather. The period or weather acquired by the decision unit 56 is information indicating the period or weather in the real world at the time the captured image 100 was captured. This current period or weather may be acquired, for example, from the real-time clock of the user terminal 12, a website connected to the user terminal 12 via the communication network NT, or the like.

Also, the decision unit 56 determines effect data based on the imaging position and imaging orientation outputted from the analysis unit 54. In this case, the decision unit 56 refers to the correlation information 50C shown in FIG. 13C and identifies the effect ID corresponding to the imaging position and imaging orientation.

Also, when there is a change in imaging position and imaging orientation, the decision unit 56 determines a plurality of effect data corresponding to the changing imaging position and imaging orientation. For example, when there is a change in the imaging position and imaging orientation, the decision unit 56 refers to the correlation information 50C in FIG. 13C in the same manner as discussed above, and identifies a plurality of effect IDs corresponding to the changing imaging position and imaging orientation.

Also, when camera work is outputted from the analysis unit 54, the decision unit 56 determines whether the camera work is a specific camera work stored in the storage unit 50. The decision unit 56 refers to the correlation information 50C in FIG. 13D, for example. Then, if the outputted camera work corresponds to a camera work stored in the correlation information 50C, the decision unit 56 makes an affirmative determination. A case in which the outputted camera work corresponds to a camera work stored in the corresponding correlation information 50C is not limited to the case where every camera work matches, and may encompass a case in which each camera work is within a specific similarity range to the others, for example. If the determination is affirmative, the decision unit 56 identifies the effect ID corresponding to that specific camera work.

Also, the decision unit 56 may identify the effect ID based on other situation information (figure type, figure shape, combination, current position, period, weather, etc.) in addition to the imaging position and imaging orientation. In this case, the decision unit 56 refers to the correlation information 50C linked to other situation information (figure type, figure shape, combination, current position, period, weather, etc.), and identifies the effect ID corresponding to that imaging position and imaging orientation.

Also, the decision unit 56 determines the output mode (position, size, sound volume, direction of sound, etc.) of effect data to be added to the captured image 100, just as in the first embodiment, based on at least the imaging position and imaging orientation outputted from the analysis unit 54.

Also, in the second embodiment, when the special effect modes "C" to "E" are selected, the decision unit 56 refers to the correlation information 50C corresponding to the selected mode and identifies the effect ID. As shown in FIG. 8, the special effect mode "C" is an "imaging position mode," in which effect data corresponding to the imaging position, imaging orientation, and camera work is added to the captured image 100. The special effect mode "D" is a "current position mode," in which effect data corresponding to the current position is added to the captured image 100. The special effect mode "E" is a "period and weather mode," in which effect data corresponding to the period or weather is added to the captured image 100.

Also, in the second embodiment, the determination unit 60 determines whether to add effect data to the captured image 100 based on the current position and the positions stored in association with the figure type, etc. For example, the determination unit 60 refers to the correlation information 50C in FIG. 13A that is linked to the figure type. The determination unit 60 then determines whether the current position acquired by the decision unit 56 corresponds to a specific position stored in the correlation information 50C. A case in which the current position corresponds to a specific position does not necessarily mean that every position matches, and also includes cases in which each position is two-dimensionally within a specific similarity range, such as when a position is included within a specific range including the current position.

Also, in the second embodiment, when the determination unit 60 determines that the current position acquired by the decision unit 56 corresponds to a specific position stored in the correlation information 50C, the display control unit 58 adds effect data to the captured image 100 and displays the resulting captured image 100. On the other hand, when the determination unit 60 determines that the current position acquired by the decision unit 56 does not correspond to a specific position stored in the correlation information 50C, the display control unit 58 displays the captured image 100 without adding any effect data.

Also, if there is a change in the imaging position and imaging orientation, the display control unit 58 switches the effect data to be added to the captured image 100 to one of the pieces of effect data determined by the decision unit 56 according to this change. Also, when a specific camera work is configured, the display control unit 58 adds effect data corresponding to this camera work to the captured image 100 and displays the resulting captured image 100.

Flow of Processing

The flow of processing performed by the functional components in the augmented reality system according to the second embodiment is the same as that in the flowchart shown in FIG. 9. The second embodiment differs from the first embodiment in the processing to acquire effect data corresponding to the special effect mode in step SP18 of FIG. 9. In the first embodiment, the flow of processing was described for when modes "A" and "B" were selected from among the special effect modes shown in FIG. 8, but in the second embodiment, the flow of processing will be described for when modes "C," "D," and "E" are selected from among the special effect modes shown in FIG. 8.

Figure 14:
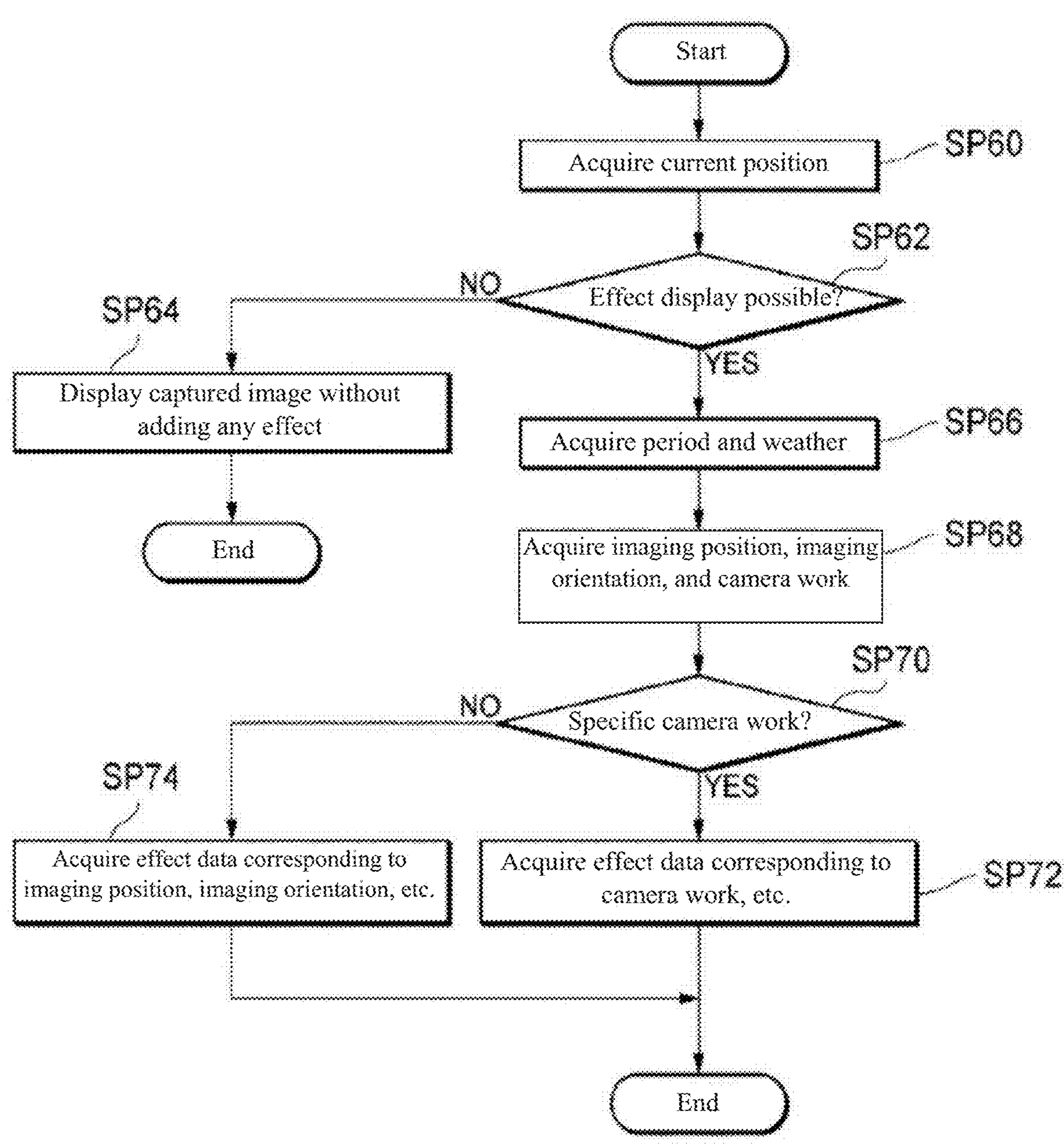
FIG. 14 is a flowchart showing an example of the flow of processing in step SP18 in the second embodiment.

In the second embodiment, the flow of the processing in step SP18 is shown in the flowchart of FIG. 14 instead of the flowchart of FIG. 10. FIG. 14 is a flowchart showing an example of the flow of processing in step SP18 in the second embodiment.

Step SP60

The decision unit 56 acquires the current position where the captured image 100 is acquired in the processing of step SP10. The processing then moves to the processing of step SP62.

Step SP62

The determination unit 60 refers to the correlation information 50C of FIG. 13A linked to the figure type acquired in the processing of step SP12. The determination unit 60 then determines whether to add effect data to the captured image 100 based on the current position acquired in the processing of step SP60 and the positions stored in the referenced correlation information 50C of FIG. 13A. If the determination is negative, the processing then moves to the processing of step SP64. If the determination is affirmative, the processing moves to the processing of step SP66.

Step SP64

The display control unit 58 displays the captured image 100 on the display 32A without adding any effect data to the captured image 100. Then, the series of processing shown in FIG. 14 ends.

Step SP66

The decision unit 56 acquires the period and weather. The processing then moves to the processing of step SP68.

Step SP68

The analysis unit 54 sequentially analyzes the captured images 100 acquired in the processing of step SP10, and acquires the imaging position and imaging orientation. Also, the analysis unit 54 acquires camera work when there is a change in the imaging position and imaging orientation. The processing then moves to the processing of step SP70.

Step SP70

When camera work is acquired in the processing of step SP68, the decision unit 56 refers to the correlation information 50C in FIG. 13D linked to the acquired situation information (the figure type, the current position, and the period and weather acquired in the processing of steps SP12, SP60, and SP66, respectively). The decision unit 56 then determines whether the acquired camera work is a specific camera work stored in the correlation information 50C. If the determination is affirmative, the processing moves to the processing of step SP72. If the determination is negative, the processing then moves to the processing of step SP74. Also, even if no camera work is acquired in the processing of step SP68, the processing moves to the processing of step SP74.

Step SP72

The decision unit 56 acquires effect data corresponding to camera work, etc. (camera work, the figure type, the current position, and the period and weather). More specifically, the decision unit 56 identifies the effect ID corresponding to the camera work for which an affirmative determination was made in the processing of step SP70, in the correlation information 50C of FIG. 13D referred to in the processing of step SP70. The decision unit 56 then refers to the effect information 50B in FIG. 5 and identifies the effect data path corresponding to the identified effect ID. The decision unit 56 then acquires the effect data stored at the storage location indicated by the effect data path. Then, the series of processing shown in FIG. 14 ends.

Step SP74

The decision unit 56 acquires effect data corresponding to the imaging position, imaging orientation, etc. (imaging position and imaging orientation, figure type, current position, and period and weather). More specifically, the decision unit 56 refers to the correlation information 50C shown in FIG. 13C linked to the acquired situation information (figure type, current position, and period and weather acquired in steps SP12, SP60, and SP66, respectively). The decision unit 56 then identifies the effect ID corresponding to the imaging position and imaging orientation acquired in the processing of step SP68. The decision unit 56 then refers to the effect information 50B in FIG. 5 and identifies the effect data path corresponding to the identified effect ID. The decision unit 56 then acquires the effect data stored at the storage location indicated by the effect data path. Then, the series of processing shown in FIG. 14 ends.

Screen Display Example

Figure 15:
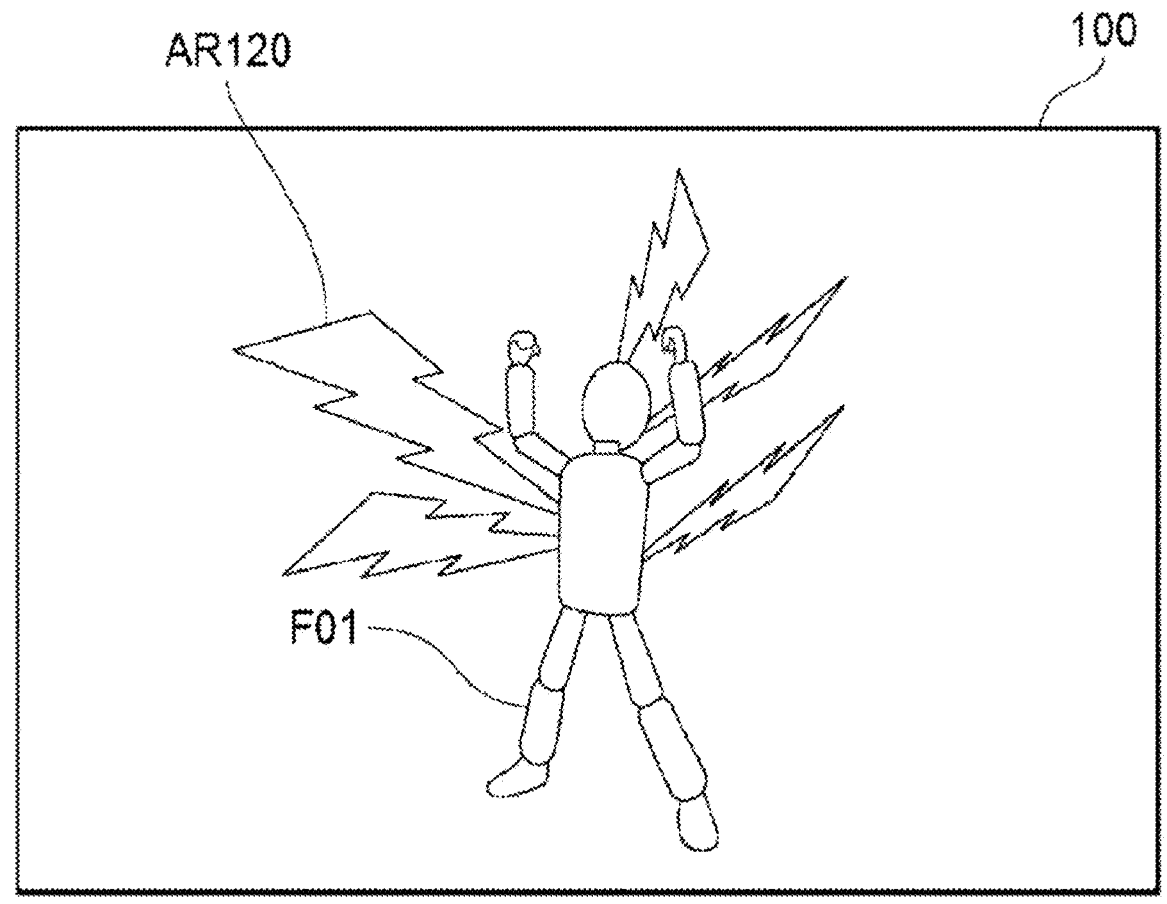
FIG. 15 is a diagram illustrating an example of captured image displayed on the display of a user terminal under display control by the display control means in the second embodiment.

FIG. 15 is a diagram showing an example of the captured image 100 displayed on the display 32A of the user terminal 12 under the display control of the display control unit 58 in the second embodiment.

For example, if a specific camera work is configured such that the camera moves from the left side of figure F01, around to the back, and then to the right side by sequentially changing the imaging position and imaging orientation as shown in FIGS. 12A, 12B, and 12C, a display effect AR120 corresponding to this camera work is acquired in the processing of step SP18. In this case, as shown in FIG. 15, in response to the configuration of the camera work, the captured image 100 on which the display effect AR120 is superimposed is displayed on the display 32A.

Although not shown in the drawings, the switching of the display effect according to changes in the imaging position and imaging orientation is performed in the same manner as the switching of the display effect according to changes in the disposition relationship described with reference to FIGS. 11C and 11D in the first embodiment. That is, switching the display effect does not simply conform to changes in the imaging position and imaging orientation, but encompasses changing to a completely different display effect according to changes in the imaging position and imaging orientation. Also, just as in the first embodiment, after the captured image 100 on which display effects based on the imaging position and imaging orientation are superimposed is displayed, the captured image of the figure F01 may be switched to the display effect of a virtual object, and after a specific change, the display effect of the virtual object switched back to the captured image of the figure F01.

Technical Effect

As discussed above, in the second embodiment, when there is a change in the three-dimensional imaging position and imaging orientation of the camera 34 with respect to a three-dimensional figure, the decision unit 56 determines a plurality of pieces of effect data based on the imaging position and imaging orientation, and the display control unit 58 switches the effect data to be added to the image to one of the pieces of effect data determined by the decision unit 56 according to the change in the imaging position and imaging orientation.

With this configuration, the user can switch the effect data to be added to the captured image 100 to effect data corresponding to the imaging position and imaging orientation by changing the imaging position and imaging orientation of the figures. Consequently, various kinds of effect data can be added to the captured image 100, such as effect data that is unique to a specific imaging position and imaging orientation, rather than effect data that simply follows changes in the imaging position and imaging orientation, and the enjoyability of the effects in the captured image 100 can be enhanced.

Also, in the second embodiment, when the camera work indicating a serial sequence of the imaging positions and imaging orientations changing in the order of change is a specific camera work, the decision unit 56 determines effect data corresponding to the specific camera work, and the display control unit 58 adds effect data corresponding to the specific camera work determined by the decision unit 56 to the captured image 100 and displays the resulting captured image 100.

With this configuration, the user can add to the captured image 100 a reenactment scene of a specific animation, etc., as effect data corresponding to a specific camera work by changing the imaging position and imaging orientation so as to configure the specific camera work. Consequently, unique effect data can be added to the captured image 100 due to the fact that the imaging position and imaging orientation that have changed over time constitute a specific camera work, and the enjoyability of the effects in the captured image 100 can be enhanced.

Also, in the second embodiment, the decision unit 56 determines effect data based on the current position when the camera 34 captures a figure.

With this configuration, different effect data can be added to the captured image 100 depending on the current position. Consequently, the user can view a captured image 100 to which is added unique effect data that can be added only at a specific position by executing the augmented reality application at a specific position.

Also, in the second embodiment, the user terminal 12 (a computer) is made to function as the determination unit 60 for determining whether to add effect data to the captured image 100 based on the current position when capturing a figure by the camera 34 and the positions stored in association with figure types, and if the determination unit 60 makes an affirmative determination, the display control unit 58 adds effect data to the captured image 100 and displays the resulting captured image 100, but if the determination unit 60 makes a negative determination, the captured image 100 is displayed without adding any effect data to the captured image 100.

With this configuration, if the current position does not correspond to a stored position, for example, effect data need not be added. Consequently, the position where effect data can be added and displayed on the captured image 100 of the figure can be limited to a specific position.

Also, in the second embodiment, the decision unit 56 determines the effect data based on the current period or weather.

With this configuration, different effect data can be added to the captured image 100 depending on the current period or weather.

Modification Examples

The present invention is not limited to the above embodiments. That is, appropriate design changes made to the above embodiments by a person skilled in the art are also encompassed by the present invention, so long as they have the characteristics of the present invention. Also, the elements of the above embodiments and the modification examples given below can be combined to the extent that this is technically possible, and combinations of these are also encompassed by the present invention, so long as they have the features of the present invention.

For example, in the first embodiment described above, an example was given in which effect data was determined based on the combination or disposition relationship, and in the second embodiment above, an example was given in which effect data was determined based on the imaging position and imaging orientation, but the information used to determine the effect data is not limited to these examples. For instance, effect data may be determined based on a specific combination of various kinds of information acquired as image analysis information for the captured image 100, such as determining effect data based on the imaging position and imaging orientation, in addition to the combination and disposition relationship. Also, effect data may be determined based on real world information, such as current position, period, weather, etc., in addition to image analysis information such as combinations and disposition relationships. Here again, just as in the above embodiments, by referring to information that stores the correlation between the desired real-world information and effect data, effect data corresponding to this information can be identified and acquired.

Also, in the first embodiment above, an example was given in which effect data was determined based on the combination and disposition relationship when a plurality of figures were captured, but if single figure is captured, for example, effect data may be determined based on the disposition relationship or disposition sequence in the captured image 100 of a single figure. Here again, the specific decision method is the same as with a plurality of figures as described in the above embodiments. That is, the effect data may be changed according to the position or orientation within the captured image 100 of the figure included in the captured image 100, or the effect data unique to a case in which the figure has moved in a specific position or orientation within a specific time may be added to the captured image 100.

Also, the method may be automatically changed based on specific information, etc., regardless of whether the normal effect mode or the special effect mode is set. For example, the method for determining effect data may be automatically changed depending on the analysis result for the captured image 100, regardless of the settings. In this case, if it is recognized from the analysis that a single figure is included in the captured image 100, the decision unit 56 determines effect data corresponding to the type or shape of that figure. On the other hand, if it is recognized that a plurality of figures are included in the captured image 100, the decision unit 56 determines effect data corresponding to the combination and disposition relationship thereof. Also, if it is recognized from the analysis that there is no change in the disposition relationship, the imaging position, and the imaging orientation, the decision unit 56 determines effect data corresponding to the disposition relationship, the imaging position, and the imaging orientation. On the other hand, if it is recognized from the analysis that there is a change in the disposition relationship, imaging position, and imaging orientation, the decision unit 56 determines effect data corresponding to the disposition sequence and camera work constituted by the change.

Also, the method for analyzing the captured image 100 used by the analysis unit 54 is not limited to what was described above. The analysis unit 54 may acquire image analysis information by performing image analysis of the captured image 100 using a specific trained model, for example. The specific trained model is constructed based on a specific machine learning algorithm using, for example, figure images and three-dimensional model data collected ahead of time as learning data, and is stored in the storage unit 50. For example, the analysis unit 54 inputs the captured image to a specific inference instruction(s) that makes use of this trained model, and acquires image analysis information outputted as the inference result by this inference instruction(s).

Also, the display screen including the captured image 100 displayed on the display 32A of the user terminal 12 under the display control of the display control unit 58 is not limited to the example described in the above embodiments. For example, in displaying the captured image 100, the display control unit 58 may output suggestion information suggesting a specific disposition relationship, disposition sequence, imaging position and imaging orientation, and camera work. The suggestion information may be a specific display, audio, or the like. In this case, the user can configure a specific disposition relationship, disposition sequence, imaging position and imaging orientation, and camera work by moving the figures and the camera 34 according to the outputted suggestion information. Also, the display control unit 58 may output or switch effect data in response to a user operation on the captured image 100 or display effect displayed on the display 32A, for example.

In addition, the correlation information 50C shown in FIGS. 7A to 7E and FIGS. 13A to 13D may be linked together in a specific relationship, not only in the linked relationships discussed above, but also by various kinds of information including specific situation information.

Also, the display effect may be a display effect (image) based on a three-dimensional model such as a polygon. In this case, in order to correctly superimpose the display effect in the orientation and depth direction of the captured object, such as a figure, image analysis information in which three-dimensional model data is associated with the image of a figure or the like with respect to the disposition position of the display effect, etc., may be utilized to specify the location where display effects are hidden by figures or other such captured objects, and partial deletion processing, such as partially masking display effects so that these areas are not displayed, may be performed. Furthermore, even if the shape of the display effect is changed, or an animation is created involving movement, changes in shape, etc., or the imaging position or the orientation of the figure or other such object being captured is changed, the above processing may be repeatedly performed so that the superimposed display will be correctly shown.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: server device (computer, information processing device), 12: user terminal (computer), 34: camera (imaging device), 50: storage unit, 52: acquisition unit, 56: decision unit, 58: display control unit, 60: determination unit, 62: setting unit, 64: game control unit

What is claimed is:

1. A non-transitory computer readable recording medium storing instructions executable by an information processing device that communicates with a user terminal via a network, the instructions causing the information processing device to execute:

acquiring pieces of identification information of a plurality of objects based on an image of the objects captured by an imaging device of the user terminal;

determining additional information based on a combination of the pieces of identification information and a disposition relationship of the objects in the image; and adding the additional information to the image and causing the user terminal to display the image to which the additional information has been added, wherein the information processing device further executes:

obtaining, in response to a change in the disposition relationship, a disposition sequence indicating a serial sequence of disposition relationships of the objects that have changed in a predetermined order within a predetermined time period, the determining includes, determining, upon detecting that the disposition sequence matches a specific disposition sequence, the additional information corresponding to the specific disposition sequence, and the displaying includes displaying the image to which the additional information corresponding to the specific disposition sequence has been added.

2. The non-transitory computer readable recording medium according to claim 1, wherein the determining includes determining a position or size of the additional information to be displayed on the image based on at least the disposition relationship, and the displaying includes displaying the image to which the additional information has been added at the position or size.

3. The non-transitory computer readable recording medium according to claim 1, wherein the instructions further cause the information processing device to execute:

storing pieces of additional information, and when displaying the image to which the additional information has been added, storing information indicating the objects included in the image as displayed objects; and once the displayed objects satisfy a specific condition, changing, or adding additional information to, the pieces of additional information stored in the storing.

4. The non-transitory computer readable recording medium according to claim 1, wherein the determining includes determining, in response to a change in a three-dimensional imaging position and imaging orientation of the imaging device with respect to a three-dimensional object, pieces of additional information based on the three-dimensional imaging position and imaging orientation that are changing, and the displaying includes switching the pieces of additional information to be added to the image such that one of the pieces of additional information is displayed on the image depending on the three-dimensional imaging position and imaging orientation that have been changed.

5. The non-transitory computer readable recording medium according to claim 4, wherein the determining includes determining, upon detecting that a camera work indicating a serial sequence of the three-dimensional imaging position and imaging orientation changing in a predetermined order matches a specific camera work, the additional information corresponding to the specific camera work, and the displaying includes displaying the image to which the additional information corresponding to the specific camera work has been added.

6. The non-transitory computer readable recording medium according to claim 1, wherein a shape of each of the objects can be changed by moving, attaching, or detaching at least one of parts of each of the objects, or rearranging the parts, and the determining includes determining pieces of additional information corresponding to the shape that is changing, and the displaying includes switching the pieces of additional information to be added to the image such that one of the pieces of additional information is displayed on the image depending on the shape that has been changed.

7. The non-transitory computer readable recording medium according to claim 1, wherein the determining includes determining the additional information based on a current position of the imaging device that captures the image of the objects.

8. The non-transitory computer readable recording medium according to claim 1, wherein the instructions further cause the information processing device to execute:

determining whether to add the additional information to the image based on a current position and positions stored in association with the pieces of identification information, the displaying includes:

when determining to add the additional information to the image, displaying the image to which the additional information has been added, and when determining not to add the additional information to the image, displaying the image without adding any additional information to the image.

9. The non-transitory computer readable recording medium according to claim 1, wherein the determining includes determining the additional information based on a predetermined actual time period or weather.

10. The non-transitory computer readable recording medium according to claim 1, wherein the additional information includes a background image to be superimposed on a background of the objects, and when superimposing the background image on the image, the displaying includes switching the image of the objects captured by the imaging device to an image of a virtual object, and after a specific change is made, the image of the virtual object is switched back to the image of the objects captured by the imaging device.

11. The non-transitory computer readable recording medium according to claim 1, wherein the instructions further cause the information processing device to execute:

controlling a specific game based on the additional information added to the image.

12. An information processing device that communicates with a user terminal via a network, the information processing device comprising:

a hardware processor that:

acquires pieces of identification information of a plurality of objects based on an image of the objects captured by an imaging device of the user terminal;

determines additional information based on a combination of the pieces of identification information and a disposition relationship of the objects in the image; and adds the additional information to the image and causes the user terminal to display the image to which the additional information has been added, wherein the hardware processor further:

in response to a change in the disposition relationship, obtains a disposition sequence indicating a serial sequence of disposition relationships of the objects that have changed in a predetermined order within a predetermined time period, in the determining, upon detecting that the disposition sequence matches a specific disposition sequence, determines the additional information corresponding to the specific disposition sequence, and in the displaying, displaying the image to which the additional information corresponding to the specific disposition sequence has been added.

* * * * *